US011978037B2

(12) United States Patent
Zarakas et al.

(10) Patent No.: US 11,978,037 B2
(45) Date of Patent: May 7, 2024

(54) SYSTEM, METHOD, AND APPARATUS FOR UPDATING AN EXISTING DYNAMIC TRANSACTION CARD

(71) Applicant: Capital One Services, LLC, McLean, VA (US)

(72) Inventors: James Zarakas, Centreville, VA (US); Adam Koeppel, Washington, DC (US); Kevin Kelly, Austin, TX (US); David Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 247 days.

(21) Appl. No.: 17/488,485

(22) Filed: Sep. 29, 2021

(65) Prior Publication Data
US 2022/0019999 A1    Jan. 20, 2022

Related U.S. Application Data

(60) Continuation of application No. 16/896,300, filed on Jun. 9, 2020, now Pat. No. 11,164,177, which is a
(Continued)

(51) Int. Cl.
*G06Q 20/34* (2012.01)
*G06K 19/02* (2006.01)
(Continued)

(52) U.S. Cl.
CPC ........... *G06Q 20/353* (2013.01); *G06K 19/02* (2013.01); *G06K 19/045* (2013.01);
(Continued)

(58) Field of Classification Search
CPC ............. G06K 19/045; G06K 19/0723; G06Q 20/341; G06Q 20/352; G06Q 20/354; G06Q 20/3563; G06Q 20/3263
See application file for complete search history.

(56) References Cited

U.S. PATENT DOCUMENTS 5,940,510 A    8/1999 Curry et al.
5,949,880 A    9/1999 Curry et al.
(Continued)

FOREIGN PATENT DOCUMENTS

CN    102413442 B    1/2015
EP    0234954 A2 *  9/1987
(Continued)

OTHER PUBLICATIONS

Notification of Transmittal of The International Search Report and The Written Opinion of the International Searching Authority from Application No. PCT/US2016/027494 dated Jul. 1, 2016.
(Continued)

*Primary Examiner* — Christle I Marshall
(74) *Attorney, Agent, or Firm* — TROUTMAN PEPPER HAMILTON SANDERS LLP; Christopher J. Forstner; John A. Morrissett

(57) ABSTRACT

A system for securely updating an electronic transaction card held by an account holder with an additional account and/or account data is described. A dynamic transaction card may be securely updated with an additional account by using pre-stored shell data and/or inactive data, whereby the pre-stored shell data may be populated using data received from an issuer system and/or the inactive data may be activated via an activation signal received from a mobile device. A backend server may determine, via a fraud determination, expiration determination, and/or user-request, that new account data should be transmitted to an account holder. The dynamic transaction card may receive the data associated with a notification, update a display, instruct an EMV applet to use a key associated with a received EMV key identifier for signatures, and/or update any additional data stored on the dynamic transaction card.

11 Claims, 13 Drawing Sheets

Related U.S. Application Data continuation of application No. 16/359,448, filed on Mar. 20, 2019, now Pat. No. 10,713,648, which is a division of application No. 15/391,921, filed on Dec. 28, 2016, now Pat. No. 10,402,818, which is a continuation of application No. 15/098,585, filed on Apr. 14, 2016, now Pat. No. 10,332,102.

(60) Provisional application No. 62/270,669, filed on Dec. 22, 2015, provisional application No. 62/147,568, filed on Apr. 14, 2015.

(51) Int. Cl.
| | | |
|---|---|---|
| *G06K 19/04* | (2006.01) | |
| *G06K 19/07* | (2006.01) | |
| *G06K 19/077* | (2006.01) | |
| *G06Q 20/04* | (2012.01) | |
| *G06Q 20/10* | (2012.01) | |
| *G06Q 20/32* | (2012.01) | |
| *G06Q 20/38* | (2012.01) | |
| *G06Q 20/40* | (2012.01) | |
| *G07F 7/08* | (2006.01) | |
| *G09B 21/00* | (2006.01) | |

(52) U.S. Cl.
CPC ..... *G06K 19/0702* (2013.01); *G06K 19/0704* (2013.01); *G06K 19/0716* (2013.01); *G06K 19/0717* (2013.01); *G06K 19/0723* (2013.01); *G06K 19/07705* (2013.01); *G06K 19/07707* (2013.01); *G06K 19/07722* (2013.01); *G06K 19/07733* (2013.01); *G06Q 20/04* (2013.01); *G06Q 20/10* (2013.01); *G06Q 20/3278* (2013.01); *G06Q 20/341* (2013.01); *G06Q 20/352* (2013.01); *G06Q 20/354* (2013.01); *G06Q 20/3552* (2013.01); *G06Q 20/3563* (2013.01); *G06Q 20/3574* (2013.01); *G06Q 20/3829* (2013.01); *G06Q 20/4016* (2013.01); *G06Q 20/405* (2013.01); *G06Q 20/409* (2013.01); *G07F 7/0833* (2013.01); *G07F 7/0846* (2013.01); *G09B 21/008* (2013.01)

(56) References Cited

U.S. PATENT DOCUMENTS

| | | | |
|---|---|---|---|
| 6,105,013 A | 8/2000 | Curry et al. | |
| 6,237,095 B1 | 5/2001 | Curry et al. | |
| 7,243,853 B1 | 7/2007 | Levy et al. | |
| 7,318,550 B2 | 1/2008 | Bonalle et al. | |
| 7,587,756 B2 | 9/2009 | Peart et al. | |
| 7,597,265 B2 | 10/2009 | Bonalle et al. | |
| 7,729,986 B1 | 6/2010 | Hoffman et al. | |
| 7,784,687 B2 | 8/2010 | Mullen et al. | |
| 7,793,845 B2 | 9/2010 | Bonalle et al. | |
| 7,793,851 B2 | 9/2010 | Mullen | |
| 7,798,415 B1 | 9/2010 | Bates et al. | |
| 7,828,220 B2 | 10/2010 | Top | |
| 7,874,492 B2 | 1/2011 | Levy et al. | |
| 7,931,195 B2 | 4/2011 | Mullen | |
| 7,946,501 B2 | 5/2011 | Borracci | |
| 7,953,671 B2 | 5/2011 | Bishop et al. | |
| 7,954,705 B2 | 6/2011 | Mullen | |
| 8,011,577 B2 | 9/2011 | Mullen et al. | |
| 8,016,191 B2 | 9/2011 | Bonalle et al. | |
| 8,019,684 B2 | 9/2011 | Hoffman et al. | |
| 8,020,775 B2 | 9/2011 | Mullen et al. | |
| 8,066,191 B1 | 11/2011 | Cloutier et al. | |
| 8,074,877 B2 | 12/2011 | Mullen et al. | |
| 8,078,532 B2 | 12/2011 | Hoffman et al. | |
| 8,082,211 B2 | 12/2011 | Hoffman et al. | |
| 8,095,113 B2 | 1/2012 | Kean et al. | |
| 8,172,148 B1 | 5/2012 | Cloutier et al. | |
| 8,215,563 B2 | 7/2012 | Levy et al. | |
| 8,282,007 B1 | 10/2012 | Cloutier et al. | |
| 8,286,876 B2 | 10/2012 | Mullen et al. | |
| 8,302,872 B2 | 11/2012 | Mullen | |
| 8,308,059 B2 | 11/2012 | Granucci et al. | |
| 8,322,623 B1 | 12/2012 | Mullen et al. | |
| 8,348,172 B1 | 1/2013 | Cloutier et al. | |
| 8,360,322 B2 | 1/2013 | Bonalle et al. | |
| 8,382,000 B2 | 2/2013 | Mullen et al. | |
| 8,393,545 B1* | 3/2013 | Mullen | G06Q 20/3552 235/487 |
| 8,393,546 B1 | 3/2013 | Yen et al. | |
| 8,413,892 B2 | 4/2013 | Mullen et al. | |
| 8,417,631 B2 | 4/2013 | Hoffman et al. | |
| 8,424,773 B2 | 4/2013 | Mullen et al. | |
| 8,429,085 B2 | 4/2013 | Faith et al. | |
| 8,459,548 B2 | 6/2013 | Mullen et al. | |
| 8,485,437 B2 | 7/2013 | Mullen et al. | |
| 8,485,446 B1 | 7/2013 | Mullen et al. | |
| 8,489,513 B2 | 7/2013 | Bishop et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,561,894 B1 | 10/2013 | Mullen et al. | |
| 8,567,679 B1 | 10/2013 | Mullen et al. | |
| 8,573,503 B1 | 11/2013 | Cloutier et al. | |
| 8,579,203 B1 | 11/2013 | Lambeth et al. | |
| 8,590,796 B1 | 11/2013 | Cloutier et al. | |
| 8,594,730 B2 | 11/2013 | Bona et al. | |
| 8,602,312 B2 | 12/2013 | Cloutier et al. | |
| 8,608,083 B2 | 12/2013 | Mullen et al. | |
| 8,622,309 B1 | 1/2014 | Mullen et al. | |
| 8,628,022 B1 | 1/2014 | Rhoades et al. | |
| 8,668,143 B2 | 3/2014 | Mullen et al. | |
| 8,684,261 B2* | 4/2014 | Burdett | G06Q 20/26 235/487 |
| 8,727,219 B1 | 5/2014 | Mullen | |
| 8,733,638 B2 | 5/2014 | Mullen et al. | |
| 8,746,579 B1 | 6/2014 | Cloutier et al. | |
| 8,757,483 B1 | 6/2014 | Mullen et al. | |
| 8,757,499 B2 | 6/2014 | Cloutier et al. | |
| 8,805,746 B2 | 8/2014 | Hoffman et al. | |
| 8,811,959 B2 | 8/2014 | Conner et al. | |
| 8,814,050 B1 | 8/2014 | Mullen et al. | |
| 8,820,638 B1 | 9/2014 | Cotter et al. | |
| 8,827,153 B1 | 9/2014 | Rhoades et al. | |
| 8,870,081 B2 | 10/2014 | Olson et al. | |
| 8,875,999 B2 | 11/2014 | Mullen et al. | |
| 8,876,011 B2 | 11/2014 | Olson et al. | |
| 8,888,009 B1 | 11/2014 | Mullen | |
| 8,931,703 B1 | 1/2015 | Mullen et al. | |
| 8,944,333 B1 | 2/2015 | Mullen et al. | |
| 8,955,744 B2 | 2/2015 | Granucci et al. | |
| 8,960,545 B1 | 2/2015 | Batra | |
| 8,973,824 B2 | 3/2015 | Mullen et al. | |
| 9,183,480 B1* | 11/2015 | Quigley | G06K 19/07707 |
| 10,614,450 B1 | 4/2020 | Templeton et al. | |
| 2003/0028481 A1* | 2/2003 | Flitcroft | G07F 7/122 705/39 |
| 2006/0205129 A1 | 9/2006 | Sato et al. | |
| 2006/0213972 A1 | 9/2006 | Kelly et al. | |
| 2007/0208671 A1 | 9/2007 | Brown et al. | |
| 2011/0080774 A1 | 4/2011 | Saito et al. | |
| 2011/0222336 A1 | 9/2011 | Kato | |
| 2012/0109735 A1 | 5/2012 | Krawczewicz et al. | |
| 2012/0254038 A1 | 10/2012 | Mullen | |
| 2012/0298747 A1* | 11/2012 | Mestre | G06Q 20/3563 235/492 |
| 2013/0191288 A1 | 7/2013 | Hoffman et al. | |
| 2013/0200999 A1* | 8/2013 | Spodak | G16H 10/65 340/5.65 |
| 2013/0217152 A1 | 8/2013 | Mullen et al. | |
| 2013/0218760 A1 | 8/2013 | Faith et al. | |
| 2013/0228616 A1 | 9/2013 | Bhosle et al. | |
| 2013/0311363 A1 | 11/2013 | Ramaci et al. | |
| 2013/0320080 A1 | 12/2013 | Olson et al. | |
| 2013/0320081 A1 | 12/2013 | Olson et al. | |
| 2014/0001269 A1 | 1/2014 | Hartwick et al. | |
| 2014/0006277 A1 | 1/2014 | Rao | |

(56) References Cited

U.S. PATENT DOCUMENTS

| | | |
|---|---|---|
| 2014/0026213 A1 | 1/2014 | Antebi et al. |
| 2014/0048596 A1 | 2/2014 | Grigg et al. |
| 2014/0058854 A1 | 2/2014 | Ranganath et al. |
| 2014/0058950 A1 | 2/2014 | Gupta |
| 2014/0117094 A1 | 5/2014 | Workley et al. |
| 2014/0129435 A1 | 5/2014 | Pardo et al. |
| 2014/0138435 A1 | 5/2014 | Khalid |
| 2014/0144984 A1 | 5/2014 | Olson et al. |
| 2014/0164154 A1 | 6/2014 | Ramaci |
| 2014/0175170 A1 | 6/2014 | Bowers |
| 2014/0203902 A1 | 7/2014 | Shippee et al. |
| 2014/0210589 A1 | 7/2014 | Grace |
| 2014/0233166 A1 | 8/2014 | O'Shea |
| 2014/0256251 A1 | 9/2014 | Caceres et al. |
| 2014/0279476 A1 | 9/2014 | Hua |
| 2014/0310184 A1 | 10/2014 | Hoffman et al. |
| 2014/0339315 A1 | 11/2014 | Ko |
| 2014/0379583 A1 | 12/2014 | Hoffman et al. |
| 2015/0004934 A1 | 1/2015 | Qian et al. |
| 2015/0006378 A1 | 1/2015 | Blythe |
| 2015/0012440 A1 | 1/2015 | Kelley et al. |
| 2015/0073983 A1 | 3/2015 | Bartenstein et al. |
| 2015/0080077 A1 | 3/2015 | Miller et al. |
| 2015/0149356 A1 | 5/2015 | Feldman |
| 2016/0307190 A1 | 10/2016 | Zarakas et al. |

FOREIGN PATENT DOCUMENTS

| | | |
|---|---|---|
| JP | 2007184715 A | 7/2007 |
| WO | 2016168457 A1 | 10/2016 |
| WO | 2016168475 A1 | 10/2016 |

OTHER PUBLICATIONS

Office Action in related EP Application No. 16780732.0, dated Jun. 12, 2020.

Extended European Search Report, Application No. 16780732.0-1202 / 3284049 PCT/US2016/027494, dated Oct. 17, 2018, six pages.

Extended European Search Report, Application No. 17211210.4-1202, dated May 23, 2018, nine pages.

Extended European Search Report, Application No. 17211216.1-1202, dated Jun. 4, 2018, nine pages.

* cited by examiner

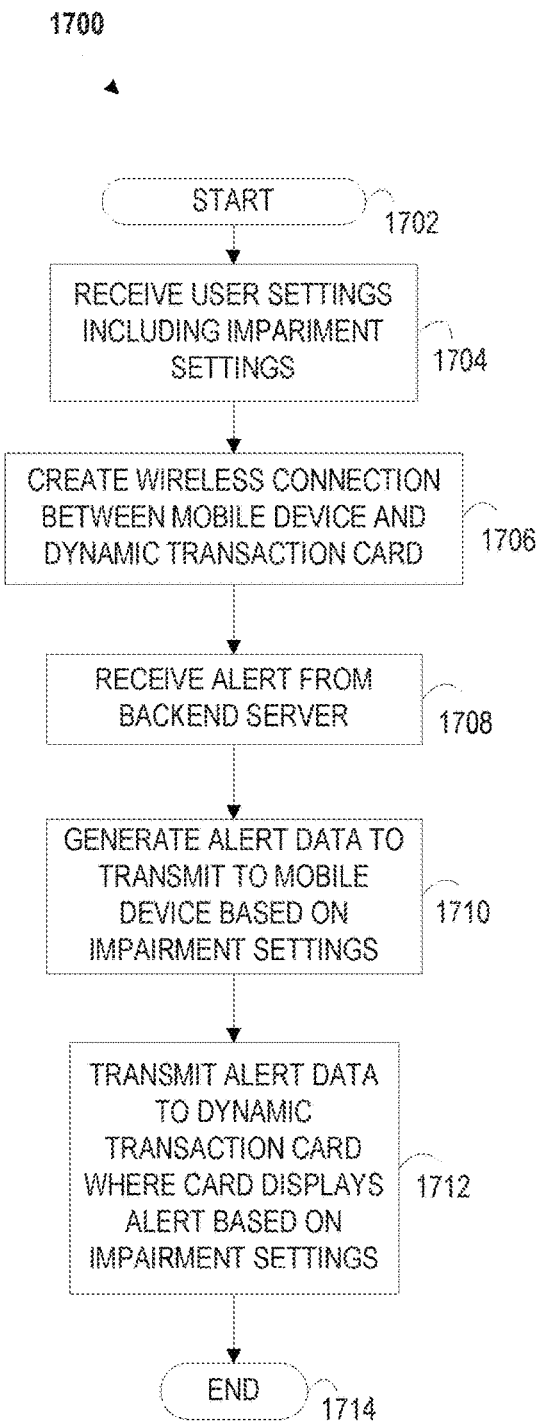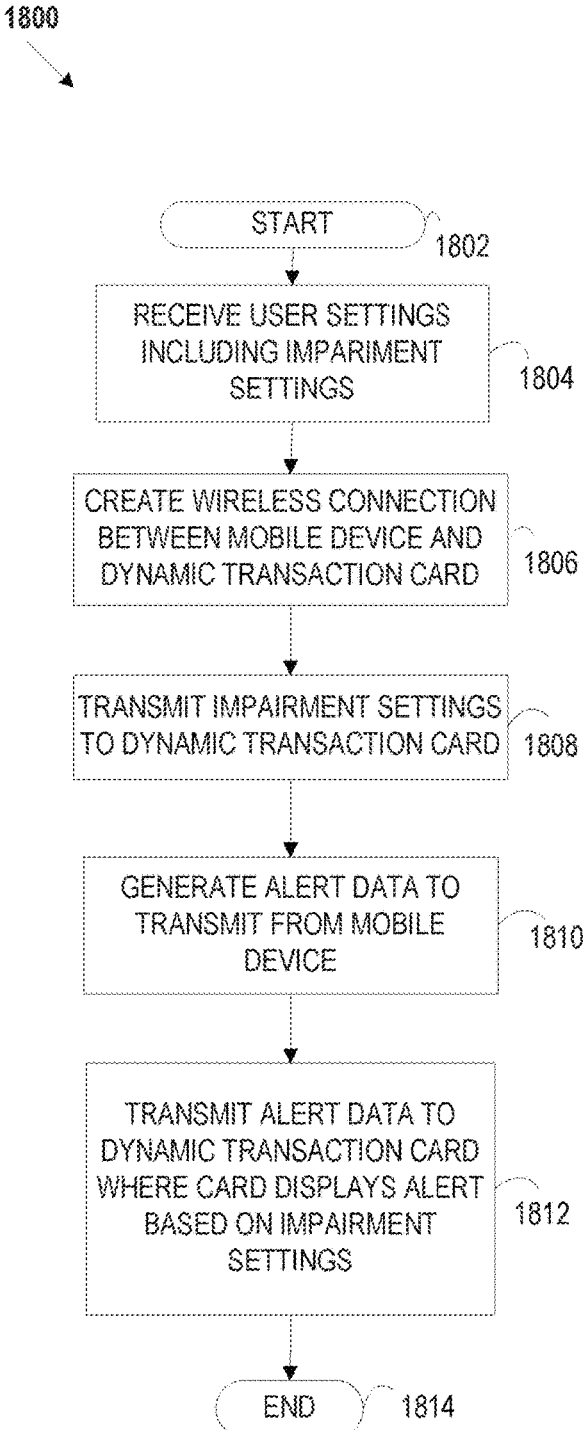
FIGURE 17
FIGURE 18

SYSTEM, METHOD, AND APPARATUS FOR UPDATING AN EXISTING DYNAMIC TRANSACTION CARD

CROSS REFERENCE TO RELATED APPLICATIONS

This application is a continuation of, and claims priority under 35 U.S.C. § 120 to, U.S. patent application Ser. No. 16/896,300, filed Jun. 9, 2020, which is a continuation of Ser. No. 16/359,448, now U.S. Pat. No. 10,713,648, filed Mar. 20, 2019, which is a divisional of U.S. patent application Ser. No. 15/391,921, now U.S. Pat. No. 10,402,818, filed Dec. 28, 2016, which is a continuation of U.S. patent application Ser. No. 15/098,585, now U.S. Pat. No. 10,332,102, filed Apr. 14, 2016, which claims the benefit of U.S. Provisional Application No. 62/147,568 filed Apr. 14, 2015, and U.S. Provisional Application No. 62/270,669, filed Dec. 22, 2015. The entire contents of these applications are incorporated herein by reference.

This application is related to U.S. Provisional Application No. 62/266,324 entitled "Printed Circuit Board with Integrated Battery" filed Dec. 11, 2015; U.S. Provisional Application No. 62/270,307 entitled "Capacitive Powertrain for a Smart Card" filed Dec. 21, 2015; U.S. Provisional Application No. 62/305,599 entitled "Smart Card EuroPay Master Card Visa ("EMV") Terminal Energy Harvesting" filed Mar. 9, 2016; U.S. patent application Ser. No. 14/977,730 entitled "A. System, Method, and Apparatus for Locating a Bluetooth Enabled Transaction Card, filed Dec. 22, 2015, which claims the benefit of U.S. Provisional Application No. 62/095,190, filed on Dec. 22, 2014; U.S. Pat. No. 9,105,025, entitled, Enhanced Near Field Communications Attachment filed on May 29, 2014, which claims the benefit of U.S. Provisional Application No. 61/570,275 filed on Dec. 13, 2011 and U.S. Provisional Application No. 61/547,910 filed on Oct. 17, 2011; U.S. Provisional Application No. 62/147,568, filed on Apr. 14, 2015, application Ser. No. 14/338,423, entitled "System and Method for Exchanging Data with Smart Cards" filed Jul. 23, 2014, which claims the benefit of U.S. Provisional Application No. 61/857,443 filed on Jul. 23, 2013; and U.S. Provisional Application No. 62/270,648 entitled "Smart Card with EMV Interface and Method of Manufacturing" filed Dec. 22, 2015. The entire contents of these applications are incorporated herein by reference.

FIELD OF THE DISCLOSURE

The present disclosure relates to a dynamic transaction card and the systems and methods relating to the dynamic transaction card. A dynamic transaction card may include components such as LEDs or light pipes embedded in the transaction card, an input mechanism, networking technologies, memory for storing transaction rules, transaction card preferences, and applications, and/or a hearing and/or visual impairment input/output interface for a dynamic transaction card.

BACKGROUND OF THE DISCLOSURE

Transaction cards, such as credit cards or debit cards, have limited capabilities. Transaction cards may include a magnetic stripe capable of storing data by modifying the magnetism of magnetic particles on the stripe. The magnetic stripe may include several tracks of data (typically track 1, track 2, and track 3) storing data about the transaction card owner or data about the account number or expiration date of an associated account.

Transaction cards may also include EuroPay-MasterCard-Visa ("EMS") cards having an integrated circuit, or EMV chip. The EMV chip in an EMV card may communicate with EMV-compliant terminals to conduct secure transactions. For example, information may be exchanged between the card and the terminal via the EMV chip, which may also require the entry of a PIN to complete a transaction. The EMV chip may dynamically store data previously stored on a magnetic strip, allowing for increased security associated with transaction cards.

However, EMV and magnetic stripe cards have limited capabilities, such as limited display capabilities, limited transaction capabilities, and limited processing capabilities. These and other drawbacks exist.

SUMMARY OF THE DISCLOSURE

Various embodiments of the present disclosure provide a dynamic transaction card, systems supporting a dynamic transaction card, and methods for operating a dynamic transaction card.

As referred to herein, a dynamic transaction card may be understood to include a transaction card that may include a number of accounts that may be activated and/or deactivated by an account holder and/or account provider, data storage that may be updated to reflect real-time and/or on-demand account and/or transaction data, and/or display components to display the updated account and/or transaction data. A dynamic transaction card may be understood to be activated (e.g., turned on) and/or deactivated (e.g., turned off) based on input received at the dynamic transaction card as described herein.

In an example embodiment, a dynamic transaction card may include a transaction card having a number of layers, each of which may be interconnected. For example, a dynamic transaction card may include an outer layer, a potting layer, a sensor layer (e.g., touch sensor layer), a display layer (including, for example, LEDs, a dot matrix display, and the like), a microcontroller storing firmware, Java applets, Java applet integration, and the like, an EMV chip, an energy storage component (e.g., battery), one or more antenna (e.g., Bluetooth antenna, NFC antenna, and the like), a power management component, a flexible printed circuit board (PCB), a chassis, and/or a card backing layer. An EMV chip may include an EMV processor and an EMV plate. An EMV processor may be within a dynamic transaction card and placed at any location within the transaction card. An EMV processor may be connected to an EMV plate, which may be placed on the external surface of the dynamic transaction card. An EMV plate may be configured to connect with the contact points of an EMV reader.

A. dynamic transaction card may include an EMV processor in communication with an applet and/or application on the dynamic transaction card. For example, data may be communicated between the EMV processor and the applet and/or application in a secure manner so that an applet and/or application residing within the dynamic transaction card may receive transaction data, account data, and/or account holder data, process the received data (e.g., compare received data to stored data, calculate a new account balance, calculate a new budget balance, calculate a new limit, store a new account balance, store a new budget balance, store a new limit, store transaction data, and/or the like). A number of configurations may be used to transmit and/or receive data between an applet/application and an EMV processor on a dynamic transaction card.

In an example embodiment, a system supporting a dynamic transaction card may include a dynamic transaction card, a mobile device, an EMV terminal, and/or a financial institution system connected over network connections (e.g., Internet, Near Field Communication (NFC), Radio Frequency Identification (RFID), Bluetooth, including Bluetooth Low Energy (BLE) and/or the like). A mobile device may include, for example, a smartphone, tablet, phablet, laptop, or the like. A mobile device may include Near Field Communication (NFC) hardware and software components, Bluetooth input/output hardware and software, and one or more processors, various input/output interfaces, and/or systems, such as transaction processing systems and account systems. These layers and/or components may be combined where appropriate. For example, a potting layer may be combined with display components to create a more elaborate display component for the EMV card.

An EMV terminal may include an input slot to receive an EMV card, an EMV reader, a display, a processor, an input/output component, one or more antenna (e.g., antenna supporting NFC, RFID, Bluetooth, WiFi Direct, and/or the like), memory, a magnetic stripe reader, and/or the like.

In an example embodiment, a financial institution system may include a number of servers and computers, each equipped with storage and components programmed with various capabilities, such as, storing cardholder data, transaction processing, and/or the like. These components may be understood to refer to computer executable software, firmware, hardware, and/or various combinations thereof.

A dynamic transaction card may include a number of interactive components, including for example, components that may execute on a microprocessor, which may interact with an EMV chip via an Application Program Interface (API) defined for the EMV chip. By interacting with the EMV chip, the microprocessor could run applications, such as an application that allows a customer to select a particular financial account to use when executing a transaction, applications that alert a customer of an account balance, applications that allow a customer to view account information (e.g., recent transactions, spending per category, budgeting information, and/or the like), applications that allow customers to activate an additional account (e.g., where a customer has an existing debit account, that customer may activate a new credit account), and/or other applications that allow a customer to interact with an account and/or account data. By way of example, an application may allow a customer to select from a credit account, a savings account, a debit account, and/or the like, where each account has information regarding the account stored on the microprocessor. As described herein, an application may generate a display (e.g., dot matrix, LED display, OLED display, and/or the like) to illustrate various features of an account such as account data (e.g., account balance, account limit, transaction history, budget balance, budget limit, and/or the like) and/or transaction data (e.g., transaction amount, effect of transaction on a budget and/or account balance, and/or the like).

Additionally, data for display may be received at the dynamic transaction card via the antenna from, for example, a mobile device in connection with the dynamic transaction card. For example, upon receiving a request to power-up the dynamic transaction card via, for example, a sensor or other input mechanism, the dynamic transaction card may request connection to a mobile device via an antenna (e.g. a Bluetooth antenna, an NFC antenna, and/or the like). Upon establishing a secure connection between the dynamic transaction card and a mobile device, the dynamic transaction card may request updated account information for accounts stored on the dynamic transaction card. A mobile device may store an application associated with the financial institution that maintains the account(s) associated with the dynamic transaction card and, upon receiving a request for updated account information from the dynamic transaction card, the financial institution application stored on the mobile device may be activated to request updated financial account information from a backend system of the financial institution maintaining the account. The financial institution application on the mobile device allows for a secure connection to be established between the mobile device and a backend system of the financial institution.

A financial institution application running on a mobile device may require a user enter one or more credentials before requesting information from a backend system. For example, credentials may include user authentication credentials, such as for example, a password, PIN, gesture, and/or biometric data (fingerprint, facial recognition, and the like). A financial institution application running on a mobile device may receive data from a dynamic transaction card that allows the application to communicate with a financial institution backend to receive updated information without received credentials input on the mobile device. For example, a mobile device and dynamic transaction card may be paired to each other such that once the dynamic transaction card and mobile device are paired, a secure communications channel may be established for all future communications. An account holder may control these features using device settings (e.g., iOS or Android settings that manage security and/or application settings) and/or mobile application(s) associated with the financial institution maintaining the account. The financial institution also may rely on the fact that a dynamic transaction is paired with a mobile device to enable requesting information from a backend system by the mobile device. In this example, the dynamic transaction card may include security features that enable the dynamic transaction card to pair with a mobile device. U.S. patent application Ser. No. 14/290,347, filed on May 29, 2014, the entire contents of which are incorporated herein by reference, describes example methods for pairing a contactless attachment with a mobile device. U.S. application Ser. No. 14/977,730, filed on Dec. 22, 2015, the entire contents of which are incorporated herein by reference, describes example methods and systems for pairing a transaction card with a mobile device.

For example, a dynamic transaction card may receive input from a sensor such as a capacitive touch sensor, a piezoelectric sensor, via load cells, an accelerometer, and/or the like. The input component (e.g., sensor) may be located at any position on the dynamic transaction card. For example, an input component may be located around the edges of a dynamic transaction card and/or at a particular point on a dynamic transaction card. An input may include a security feature, such as a biometric feature (e.g., fingerprint, eye scan, voice recognition, and/or the like). For example, a sensor may include technology to receive a security input, similar to the Apple® Touch ID which reads a fingerprint to activate features of a mobile device such as payment and unlocking a device. Upon receiving the input, a dynamic transaction card may generate and transmit a request for information associated with the accounts stored on the dynamic transaction card. In generating and/or transmitting a request for information associated with the accounts stored on the dynamic transaction card, the information may be displayed as described herein. Accordingly, the information may be displayed upon receiving any type of input as described herein.

The accounts stored on the dynamic transaction card may be related to any transaction account associated with a financial institution. In an example embodiment, the dynamic transaction card also may store accounts related to multiple financial institutions. The dynamic transaction card may store account identifiers (e.g., account number, account ID, account nickname, account holder name, account holder ID, and/or the like), account balance data (e.g., account balance, spending limit, daily spending limit, and/or the like), recent transaction data (e.g., transaction amount, merchant name, transaction date, transaction time, and/or the like), and/or account history data (e.g., payment amounts, payment dates, transaction history, and/or the like). The dynamic transaction card also may receive data via a mobile device and/or financial institution backend upon request to reduce the amount of data stored on the dynamic transaction card.

In order to receive and transmit data, a dynamic transaction card may include, for example, NFC, WiFi Direct and/or Bluetooth technologies, such as various hardware and software components that use Bluetooth, or a wireless technology standard for exchanging data over short distances. Bluetooth, WiFi Direct or NFC technology may include technology to transmit data using packets, such that each packed is transmitted over a channel. For example, a Bluetooth channel may have a bandwidth of 1. MHz or 2 MHz with the number of channels being 79 or 40, respectively. Hardware that may be included in Bluetooth, WiFi Direct, and/or NFC technology includes a Bluetooth/NFC/WiFi Direct device or chipset with a transceiver, a chip, and an antenna. The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like.

Once data is received at a dynamic transaction card, the data may be displayed and/or an indication of the data may be displayed via the display components in the dynamic transaction card. For example, a series of LED lights and/or a light pipes may indicate a balance associated with an account via color, via the number of LED lights illuminated, via a pattern of illumination, and/or the like. As another example, a dot matrix may display various alphanumeric characters to display account data, transaction data, and/or any other data requested from an account holder in possession of the dynamic transaction card.

A dynamic transaction card may remain active until a user deactivates an input associated with the dynamic transaction card (e.g., removing input from the capacitive touch sensors, piezoelectric sensors and/or load cells). A dynamic transaction card may remain active until a user provides additional input to input components associated with the dynamic transaction card (e.g., by touching for a second time a capacitive touch sensor, and/or the like).

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIG. 17 depicts an example embodiment of a method for providing display settings of a dynamic transaction card according to embodiments of the disclosure; and FIG. 18 depicts an example embodiment of a method for providing display settings of a dynamic transaction card according to embodiments of the disclosure.

DETAILED DESCRIPTION OF THE EMBODIMENTS

Figure 1:
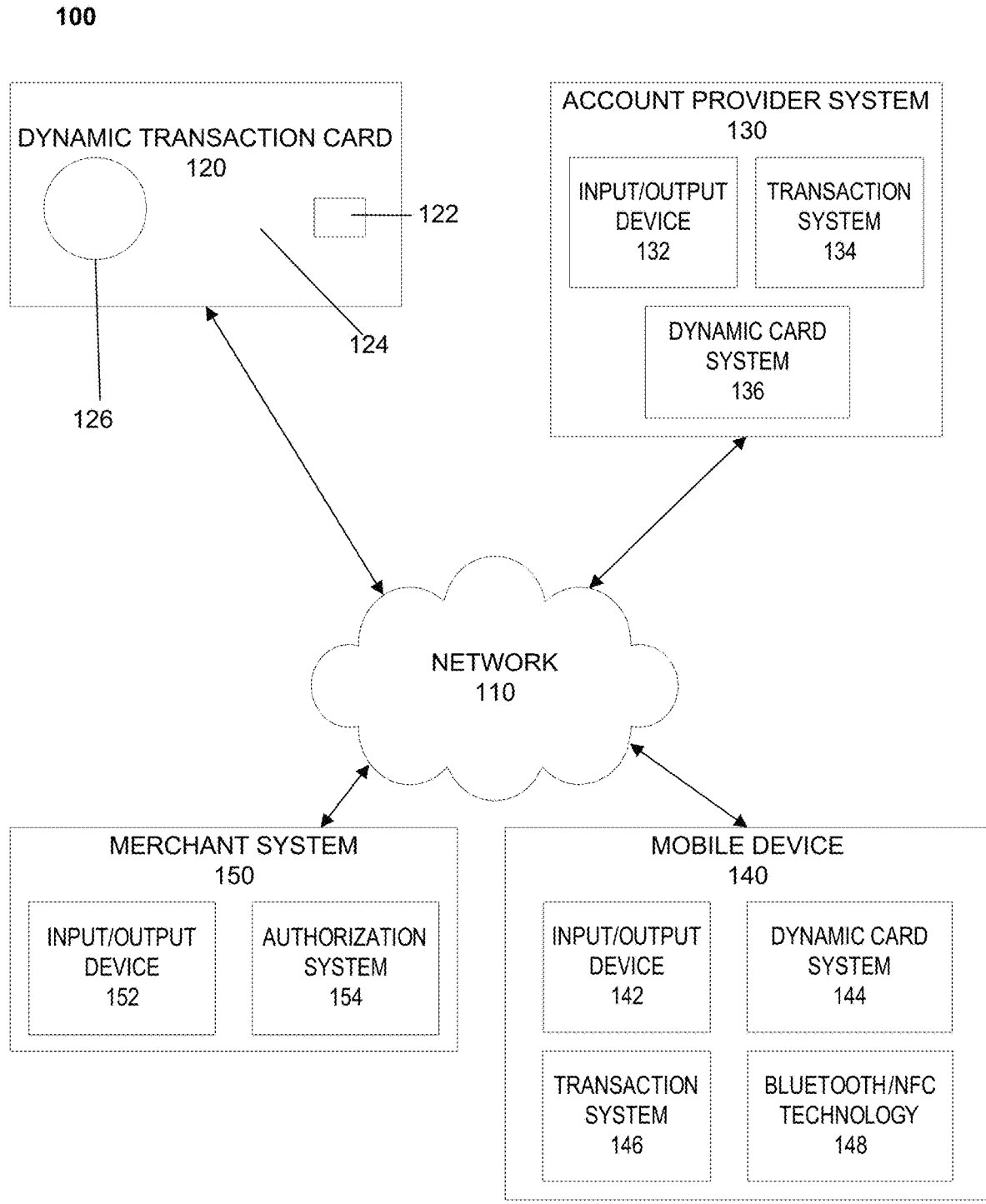
FIG. 1 depicts an example embodiment of a system including a dynamic transaction card according to embodiments of the disclosure.

The following description is intended to convey a thorough understanding of the embodiments described by providing a number of specific example embodiments and details involving a dynamic transaction card and systems and methods for using a dynamic transaction card. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only. For example, many other account providers may exist, such as retail stores, loyalty programs, membership programs, transportation providers (e.g., a fare card), a housing provider, and the like.

Additionally, an EMV card is used as an example of a dynamic transaction card. A. dynamic transaction card may include any type of transaction card that includes a microcontroller-enabled card used in any type of transaction, including, for example, debit cards, credit cards, pre-paid cards, cards used in transportation systems, membership programs, loyalty programs, hotel systems, and the like. A dynamic transaction card may include enhanced features, including hardware, software, and firmware, beyond the traditional features of a magnetic stripe or EMV card. The use of "mobile device" in the examples throughout this application is only by way of example. Any type of device capable of communicating with a dynamic transaction card may also be used, including, for example, personal computers, tablets, gaming systems, televisions, or any other device capable of communicating with a dynamic transaction card.

According to the various embodiments of the present disclosure, a dynamic transaction card and systems and methods for using a dynamic transaction card are provided. Such embodiments may include, for example, a transaction card including various components to facilitate the notifications, alerts, and/or other output on a dynamic transaction card to an account holder associated with the dynamic transaction card. Notifications, alerts, and output may be provided in the form of LED lights and/or colors, LED lighting patterns, dot matrix displays, and/or the like, which as situated on and/or within a dynamic transaction card. Interactive elements of a dynamic transaction card may be activated, triggered, and/or made available via an input component on the dynamic transaction card. For example, a dynamic transaction card may include a capacitive touch sensor, a piezoelectric sensor, via load cells, and/or the like. These types of sensors may activate, trigger, and/or make available display and/or LED lighting information to alert and/or notify a dynamic transaction card holder.

In various embodiments, providing the alerts, notifications, and/or other output on a dynamic transaction card could be provided with the assistance of a network environment, such as a cellular or Internet network. For example, a mobile device may request and/or receive data indicative of notifications, alerts, and/or output to be displayed on a dynamic transaction card from a financial institution system via a network. A mobile device may then relay the data via a network (e.g., NFC, Bluetooth, and/or the like) to the dynamic transaction card for storage and/or to activate, trigger, and/or output notifications and/or alerts.

FIG. 1 depicts an example system 100 including a dynamic transaction card. As shown in FIG. 1, an example system 100 may include one or more dynamic transaction cards 120, one or more account provider systems 130, one or more user devices 140, and one or more merchant systems 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, DAMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

User device 140 and/or merchant system 150 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Account provider system 130, user device 140, and/or merchant system 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, account provider system may include components such as those illustrated in FIG. 3 and/or FIG. 9. Merchant system may include, for example, components illustrated in FIG. 8 and/or FIG. 9.

Account provider system 130, user device 140, and/or merchant system 150 may include at least one central processing unit (CPU), which may be configured to execute computer program instructions to perform various processes and methods. Account provider system 130, user device 140, and/or merchant system 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

Account provider system 130, user device 140, and/or merchant system 150 may further include, for example, a processor, which may be several processors, a single processor, or a single device having multiple processors. Although depicted as single elements, it should be appreciated that according to one or more embodiments, account provider system 130, user device 140, and/or merchant system 150 may comprise a plurality of account provider systems 130, user devices 140, and/or merchant systems 150.

Account provider system 130, user device 140, and/or merchant system 150 may further include data storage. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage or any other storage mechanism.

As shown in FIG. 1, each account provider system 130, user device 140, and/or merchant system 150 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, system 100 may include a dynamic transaction card 120. A dynamic transaction card may include any transaction card that is able to display alerts, notifications, and/or other output to a card holder via a display and/or LED lighting 126 and/or receive input to interact with the dynamic transaction card via, for example, a sensor 1.24. Although FIG. 1 depicts a single sensor, 124, multiple sensors may be included in dynamic transaction card 124. Dynamic transaction card 120 also may be composed of various materials that enable the entire exterior surface of card 120 to act as a sensor. A dynamic transaction card may be able to communicate with, for example, a mobile device using RFID, Bluetooth, NFC, WiFi Direct and/or other related technologies. For example, communications between a dynamic transaction card and a mobile device may include methods, systems, and devices described in U.S. patent application Ser. No. 14/338,423 filed on Jul. 23, 2014, the entire contents of which are incorporated herein by reference.

A dynamic transaction card may be able to communicate with EMV terminals via contact points positions on the exterior of card 120, such as those positions on an EMV chip 122 located on the dynamic transaction card 120 or an EMV plate positions on the exterior of card 120 connected to an EMV processor within card 120. For example, contact points position on the exterior of card 120 may be directly connected and adjacent to an EMV processor (e.g., EMV chip 1.22). In another example, the contact points positions on the exterior of card 120 may be connected to an EMV processor sing a form of wired connection (e.g., electrical wiring, plastic jumpers, and/or the like) such that the EMV processor may be positioned at any location in the interior of card 120 as described in U.S. Provisional Application 62/270,648, the entire contents of which are incorporated herein by reference.

Figure 2:
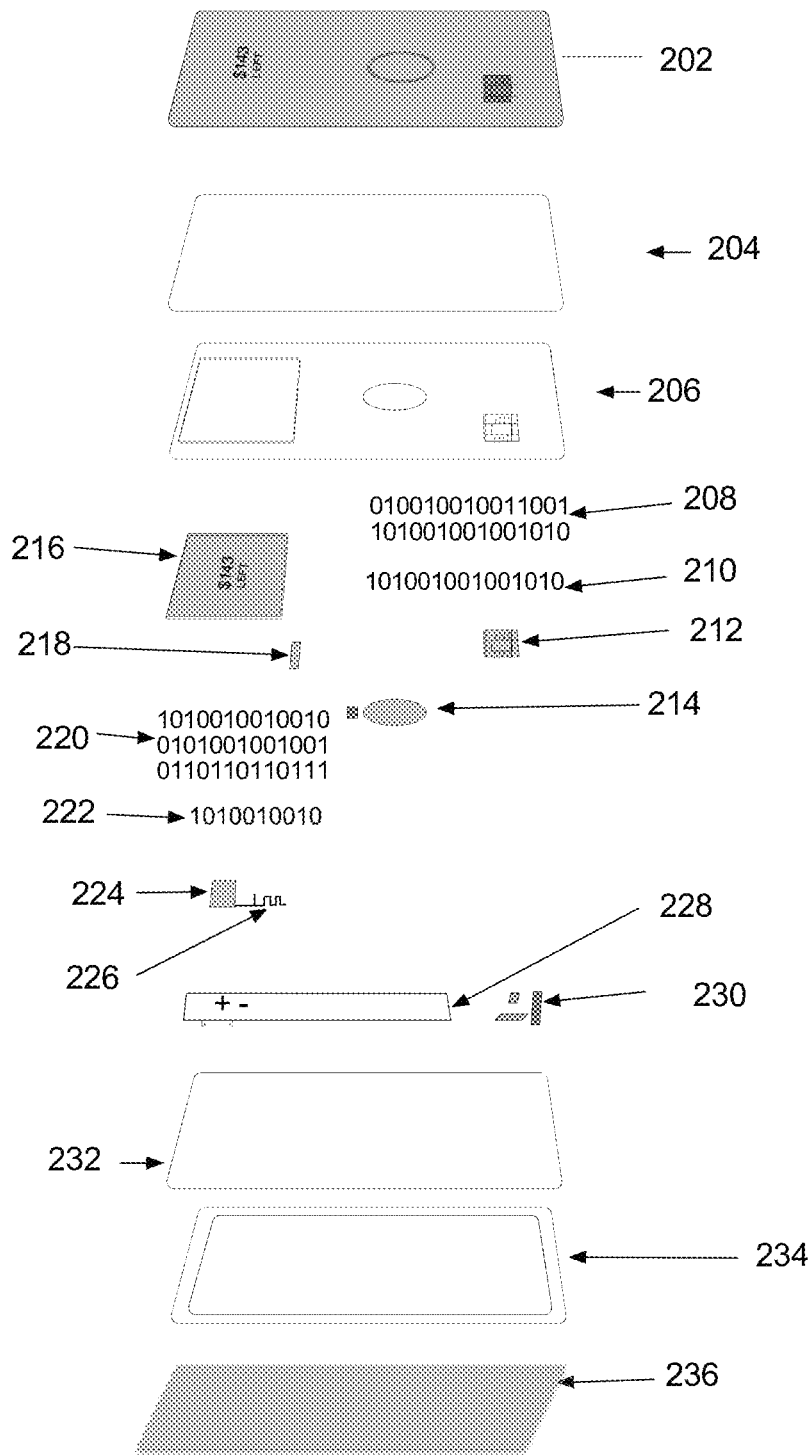
FIG. 2 depicts an example embodiment of a dynamic transaction card according to embodiments of the disclosure.
Figure 7:
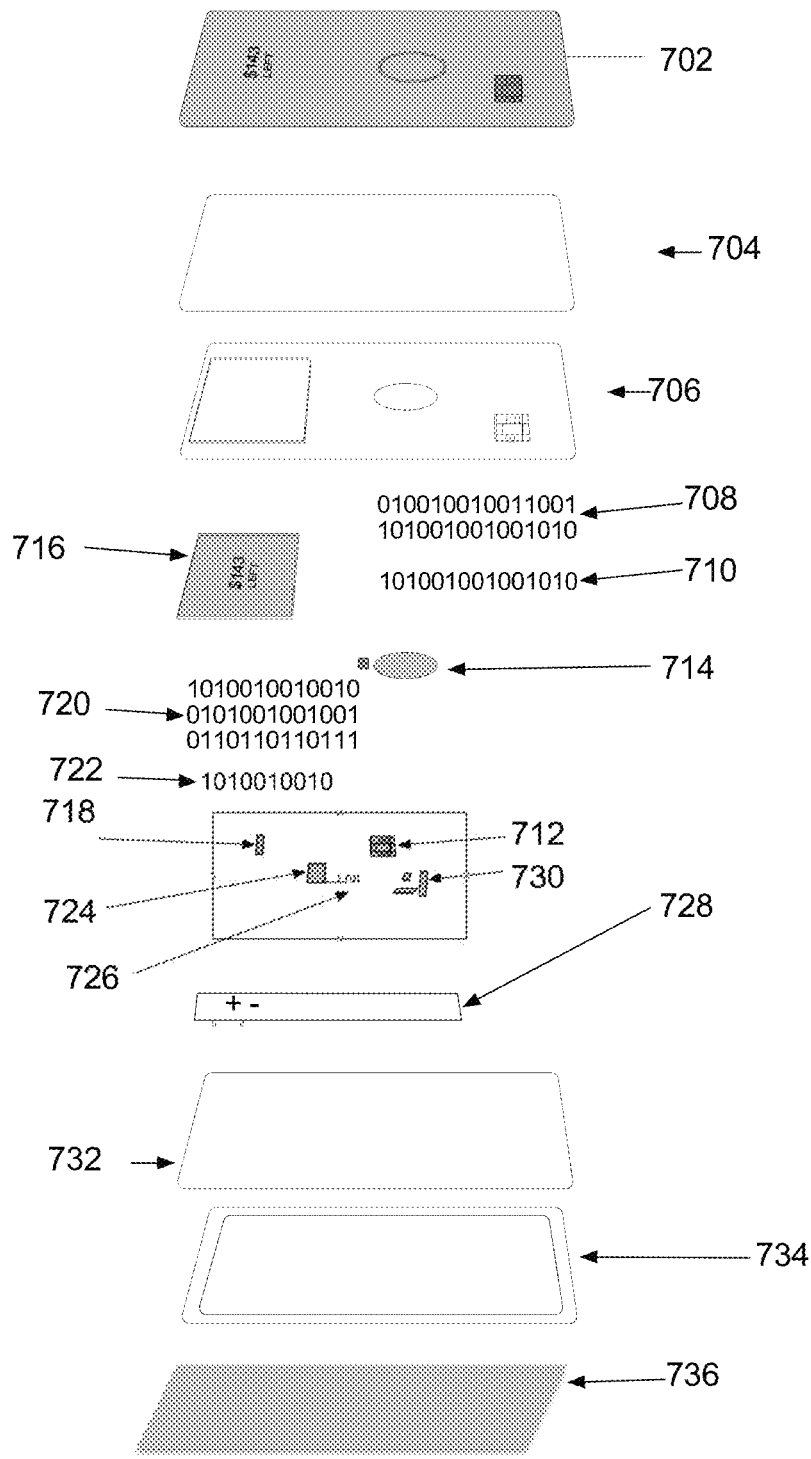
FIG. 7 depicts an example embodiment of a dynamic transaction card according to embodiments of the disclosure.

A dynamic transaction card 120 may also include hardware components to provide contactless payments and/or communications. For example, dynamic transaction card 120 may include an output layer, an outer protective layer, potting, application (e.g., a Java Applet), application integration (e.g., Java Applet integration), an EMV chip 122, one or more sensors, a display, a display driver, firmware, a bootloader, a microcontroller, one or more antenna, an energy storage component, power management, a flexible PCB, a chassis, and/or card backing as illustrated in FIGS. 2 and 7. An EMV chip 122 embedded in the dynamic transaction card 120 may include a number of contacts that may be connected and activated using an interface device.

Account provider system 130 may include systems associated with, for example, a banking service company such as Capital One®, Bank of America®, Citibank®, Wells Fargo®, Sun Trust, various community banks, and the like, as well as a number of other financial institutions such as Visa®, MasterCard®, and American Express® that issue credit and/or debit cards, for example, as transaction cards. Account provider system 130 may include and/or be connected to one or more computer systems and networks to process transactions. For example, account provider system 130 may process transactions as shown and described in FIGS. 3 and 9 below. Account provider system 1.30 may include systems associated with financial institutions that issue transaction cards, such as a dynamic transaction card 120, and maintains a contract with cardholders for repayment. In various embodiments, an account provider system 130 may issue credit, debit, and/or stored value cards, for example. Account provider system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, checkcashing locations, payday lending, currency exchanges, microloan organizations, crowd-funding or crowd-sourcing entities, third-party payment processors, etc.).

Account provider system 130 may include an input/output device 132, a transaction system 134, and a dynamic transaction card system 136. Input/output device 132 may include for example, I/O devices, which may be configured to provide input and/or output to providing party system 130 (e.g., keyboard, mouse, display, speakers, printers, modems, network cards, etc.). Input/output device 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of account provider system 130, and a bus that allows communication among the various components of account provider system 130. Input/output device 132 may include a display, which may include for example output devices, such as a printer, display screen (e.g., monitor, television, and the like), speakers, projector, and the like. Although not shown, each account provider system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Transaction system 134 may include various hardware and software components to communicate between a merchant, acquisition system, account provider system, and/or a user device to process a transaction, such as a user purchase. dynamic transaction card system 136 may include various hardware and software components, such as data storage (not shown) to store data associated with a dynamic transaction card (e.g., card number, account type, account balance, account limits, budget data, recent transactions, pairing data such as time and date of pairing with a mobile device, and the like) and cardholder data (e.g., cardholder name, address, phone number(s), email address, demographic data, and the like).

A mobile device 140 may be any device capable of communicating with a transaction card 120 via, for example, Bluetooth technology, NFC technology, WiFi Direct technology, and/or the like and execute various functions to transmit and receive account data (e.g., card number, account type, account balance, account limits, budget data, recent transactions, and/or the like) associated with dynamic transaction card 120. For example, user device 140 could be an iPhone, iPod, iPad, and/or Apple Watch from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

User device 140 may include for example, an input/output device 142, a location system 144, and a transaction system 146. Input/output device 142 may include, for example, a Bluetooth device or chipset with a Bluetooth transceiver, a chip, and an antenna. The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the user device 140 (e.g., The Android platform, the iOS platform). Using a Bluetooth API, an application stored on a mobile device 140 (e.g., a banking application, a financial account application, etc.) or the device may be able to scan for other Bluetooth devices (e.g., a dynamic transaction card 120), query the local Bluetooth adapter for paired Bluetooth devices, establish RFCOMM channels, connect to other devices through service discovery, transfer data to and from other devices or a transaction card 120, and manage multiple connections. A Bluetooth API used in the methods, systems, and devices described herein may include an API for Bluetooth Low Energy (BLE) to provide significantly lower power consumption and allow a mobile device 140 to communicate with BLE devices that have low power requirements, such dynamic transaction card 120.

Input/output device 142 may include for example, I/O devices, which may be configured to provide input and/or output to mobile device 140 (e.g., keyboard, mouse, display, speakers, printers, modems, network cards, etc.). Input/output device 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of mobile device 140, and a bus that allows communication among the various components of mobile device 140. Input/output device 142 may include a display, which may include for example output devices, such as a printer, display screen (e.g., monitor, television, and the like), speakers, projector, and the like. Although not shown, each mobile device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output device 142 may also include an NFC antenna and secure element (SE). The SE may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Input/output device 142 may enable Industry Standard NFC Payment Transmission. For example, the input/output device 142 may enable two loop antennas to form an air-core transformer when placed near one another by using magnetic induction. Input/output device 142 may operate at 13.56 MHz or any other acceptable frequency. Also, input/output device 142 may provide for a passive communication mode, where the initiator device provides a carrier field, permitting answers by the target device via modulation of existing fields. Additionally, input/output device 142 also may provide for an active communication mode by allowing alternate field generation by the initiator and target devices.

Input/output device 142 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output device 142 may be capable of utilizing standardized transmission protocols, for example but not by way of limitation, ISO/IEC 14443 A/B, ISO/IEC 18092, MiFare, FeliCa, tag/smartcard emulation, and the like. Also, input/output device 142 may be able to utilize transmission protocols and methods that are developed in the future using other frequencies or modes of transmission. Input/output device 142 may also be backwards-compatible with existing techniques, for example RFID. Also, the system may support transmission requirements to meet new and evolving standards including internet based transmission triggered by NFC.

Dynamic transaction card system 144 may work with input/output device 142 to generate and receive account data associated with a dynamic transaction card 120. For example, dynamic transaction card system may include various hardware and software components such as a processor and data storage to store dynamic transaction card data (e.g., cardholder name, address, phone number(s), email address, demographic data, card number, account type, account balance, account limits, budget data, recent transactions and the like).

Transaction system 146 may include various hardware and software components, such as data storage and a processor that may work with input/output device 142 to communicate between a merchant, acquisition system, account provider system, and/or a mobile device to process a transaction, such as a user purchase.

Mobile device 140 may also include various software components to facilitate the operation of a dynamic transaction card 120. For example, mobile device 140 may include an operating system such as, for example, the iOS operating system from Apple, the Google Android operating system, and the Windows Mobile operating system from Microsoft. Mobile device 140 may also include, without limitation, software applications such as mobile banking applications and financial institution application to facilitate use of a dynamic transaction card 120, an NFC application programming interface, and software to enable touch sensitive displays. Mobile banking applications and/or financial institution applications may be combined and/or separate from a dynamic transaction card system 144. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and a NFC Data Exchange Format (NDEF) API for reading/writing.

Software applications on mobile device 140, such as mobile banking applications and applications associated with a dynamic transaction card 120, may include card on/off features that allow a cardholder associated with a mobile device 140 to enable and disable a transaction card. For example, a card holder may use, for example, a mobile banking application stored on a user device 140 to disable and/or enable accounts associated with a dynamic transaction card 120. A mobile banking application may include, for example, an application as displayed on mobile device 420 in FIG. 4. In this example, a dynamic transaction card 120 may have account data pre-stored on the dynamic transaction card 120 to associate a number of different accounts with the dynamic transaction card (e.g., debit card, credit card, prepaid card, and/or the like). If a card holder has a credit account established and desires to establish a debit card account associated with the dynamic transaction card 120, the card holder may use a mobile device 140 and/or dynamic transaction card 120 to activate the inactive debit account on the dynamic transaction card 120.

Figure 8:
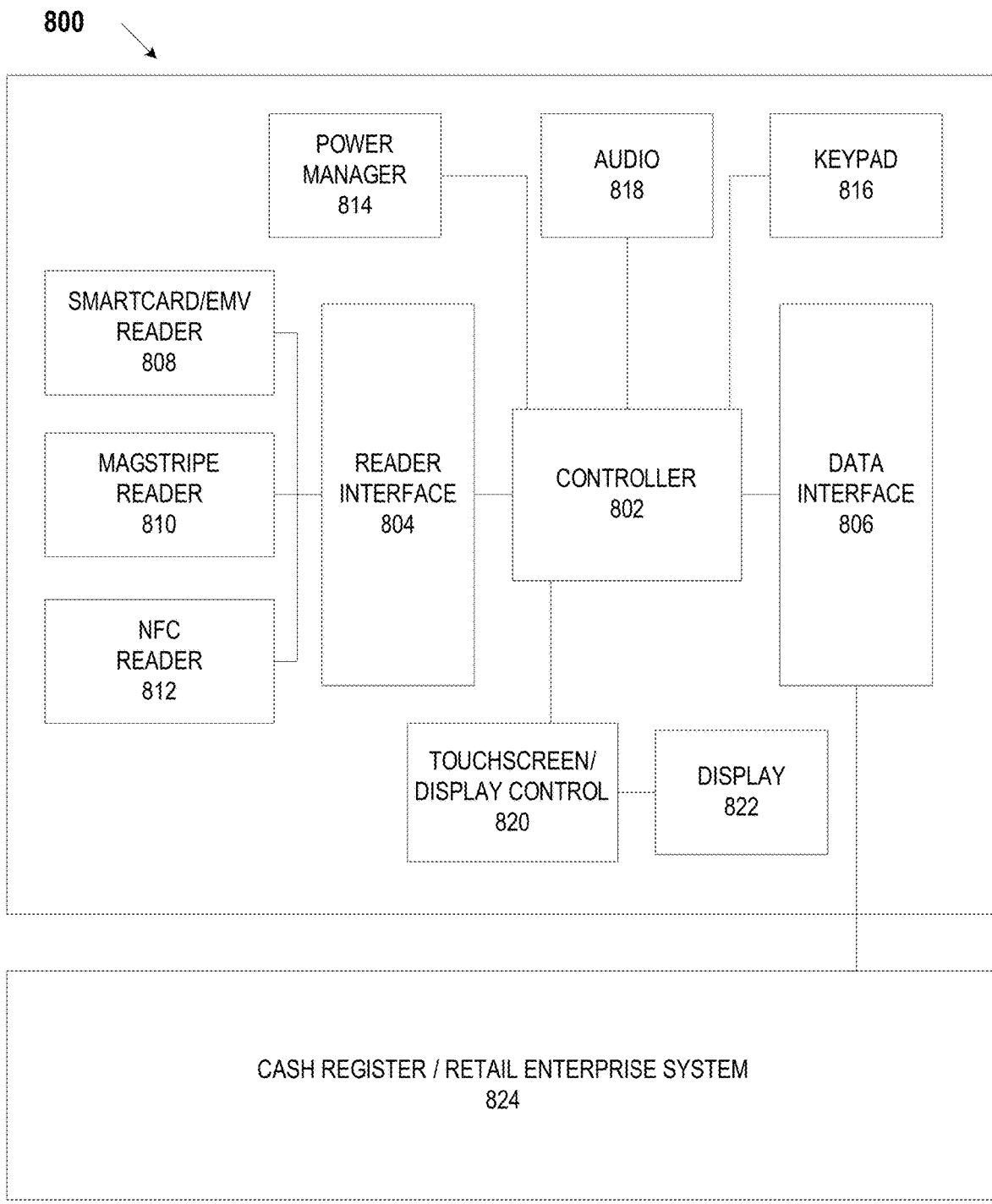
FIG. 8 depicts an example embodiment of a system including a dynamic transaction card according to embodiments of the disclosure.

Merchant system 150 may include, among other components, a Point-of-Sale (PoS) device, an input/output device 152, and an authorization system 154. As illustrated in FIG. 8, a PoS device may include a variety of readers to read transaction data associated with a transaction taking place with a merchant. PoS device may include various hardware and/or software components required to conduct and process transaction. Merchant system 150 may also include data storage (not shown) to store transaction data and/or approval of charges between a cardholder and the merchant associated with the PoS device.

An input/output device 152 may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output device 152 may include for example, I/O devices, which may be configured to provide input and/or output to and/or from merchant system 150 (e.g., keyboard, mouse, display, speakers, printers, modems, network cards, etc.). Input/output device 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of merchant system 150, and a bus that allows communication among the various components of merchant system 150. Input/output device 152 may include a display, which may include for example output devices, such as a printer, display screen (e.g., monitor, television, and the like), speakers, projector, and the like. Although not shown, merchant system 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. Authorization system 154 may include various software and/or hardware component to enable authorization of a transaction at a merchant system using, for example, a PoS device.

FIG. 8 depicts an example PoS device 800. PoS device 800 may provide the interface at what a card holder makes a payment to the merchant in exchange for goods or services. PoS device may be similar to PoS device at a merchant system 150. PoS device 800 may include and/or cooperate with weighing scales, scanners, electronic and manual cash registers, electronic funds transfer at point of sale (EFTPOS) terminals, touch screens and any other wide variety of hardware and software available for use with PoS device 800. PoS device 800 may be a retail point of sale system and may include a cash register and/or cash register-like computer components to enable purchase transactions. PoS device 800 also may be a hospitality point of sale system and include computerized systems incorporating registers, computers and peripheral equipment, usually on a computer network to be used in restaurant, hair salons, hotels or the like. PoS device 800 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 800 also may be a cloud-based point of sale system that can be deployed as software as a service, which can be accessed directly from the Internet using, for example, an Internet browser.

Referring to FIG. 8, an example PoS device 800 is shown. PoS device 800 may include a controller 802, a reader interface 804, a data interface 806, a smartcard and/or EMV chip reader 808, a magnetic stripe reader 810, a near-field communications (NFC) reader 812, a power manager 814, a keypad 816, an audio interface 818, a touchscreen/display controller 820, and a display 822. Also, PoS device 800 may be coupled with, integrated into, or otherwise connected with a cash register/retail enterprise system 824.

In various embodiments, Controller 802 may be any controller or processor capable of controlling the operations of PoS device 800. For example, controller 802 may be an Intel® 2nd Generation Core™ i3 or i5 or Pentium™ G850 processor or the like. Controller 802 also may be a controller included in a personal computer, smartphone device, tablet PC or the like.

Reader interface 804 may provide an interface between the various reader devices associated with PoS device 800 and PoS device 800. For example, reader interface 804 may provide an interface between smartcard and/or EMV chip reader 808, magnetic stripe reader 810, NFC reader 812 and controller 802. In various embodiments, reader interface 804 may be a wired interface such as a USB, RS232 or RS485 interface and the like. Reader interface 804 also may be a wireless interface and implement technologies such as Bluetooth, the 802.11(x) wireless specifications and the like. Reader interface 804 may enable communication of information read by the various reader devices from the various reader devices to PoS device 800 to enable transactions. For example, reader interface 804 may enable communication of a credit or debit card number read by a reader device from that device to PoS device 800. In various embodiments, reader interface 804 may interface between PoS device 800 and other devices that do not necessarily "read" information but instead receive information from other devices.

Data interface 806 may allow PoS device 800 to pass communicate data throughout PoS device and with other devices including, for example, cash register/retail enterprise system 824. Data interface 806 may enable PoS device 800 to integrate with various customer resource management (CRM) and/or enterprise resource management (ERP) systems. Data interface 806 may include hardware, firmware and software that make aspects of data interface 806 a wired interface. Data interface 806 also may include hardware, firmware and software that make aspects of data interface 806 a wireless interface. In various embodiments, data interface 806 also enables communication between PoS device other devices.

Smartcard and/or EMV chip reader 808 may be any electronic data input device that reads data from a smart card (e.g. a transaction card as described herein) and/or EMV chip. Smartcard and/or EMV chip reader 808 may be capable of supplying an integrated circuit (e.g., EMV chip) on the transaction card with electricity and communicating with the transaction card via protocols, thereby enabling read and write functions. In various embodiments, smartcard and/or EMV chip reader 808 may enable reading from contact or contactless transaction cards. Smartcard and/or EMV chip reader 808 also may communicate using standard protocols including ISO/IEC 7816, ISO/IEC 14443 and/or the like or proprietary protocols.

Magnetic stripe reader 810 may be any electronic data input device that reads data from a magnetic stripe on a credit or debit card, for example. In various embodiments, magnetic stripe reader 810 may include a magnetic reading head capable of reading information from a magnetic stripe. Magnetic stripe reader 810 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 812 may be any electronic data input device that reads data from an NFC device. In an example embodiment, NFC reader 812 may enable Industry Standard NFC Payment Transmission. For example, the NFC reader 812 may communicate with an NFC enabled device to enable two loop antennas to form an air-core transformer when placed near one another by using magnetic induction. NFC reader 812 may operate at 13.56 MHz or any other acceptable frequency. Also, NFC reader 812 may enable a passive communication mode, where an initiator device provides a carrier field, permitting answers by the target device via modulation of existing fields. Additionally, NFC reader 812 also may enable an active communication mode by allowing alternate field generation by the initiator and target devices.

In various embodiments, NFC reader 812 may deactivate an RF field while awaiting data. NFC reader 812 may receive communications containing Miller-type coding with varying modulations, including 100% modulation. NFC reader 812 also may receive communications containing Manchester coding with varying modulations, including a modulation ratio of approximately 10%, for example. Additionally, NFC reader 812 may be capable of receiving and transmitting data at the same time, as well as checking for potential collisions when the transmitted signal and received signal frequencies differ.

NFC reader 812 may be capable of utilizing standardized transmission protocols, for example but not by way of limitation, ISO/IEC 14443 A/13, ISO/IEC 18092, MiFare, FeliCa, tag/smartcard emulation, and the like. Also, NFC reader 812 may be able to utilize transmission protocols and methods that are developed in the future using other frequencies or modes of transmission. NFC reader 812 also may be backwards-compatible with existing payment techniques, such as, for example MD. Also, NFC reader 812 may support transmission requirements to meet new and evolving payment standards including internet based transmission triggered by NFC. In various embodiments, NFC reader 812 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 814 may be any microcontroller or integrated circuit that governs power functions of PoS device 800. Power manager 814 may include, for example, firmware, software, memory, a CPU, a CPU, input/output functions, timers to measure intervals of time, as well as analog to digital converters to measure the voltages of the main energy storage component or power source of PoS device 800. In various embodiments, Power manager 814 remains active even when PoS device 800 is completely shut down, unused, and/or powered by the backup energy storage component. Power manager 814 may be responsible for coordinating many functions, including, for example, monitoring power connections and energy storage component charges, charging batteries when necessary, controlling power to other integrated circuits within PoS device 800 and/or other peripherals and/or readers, shutting down unnecessary system components when they are left idle, controlling sleep and power functions (on and off), managing the interface for built-in keypad and trackpads, and/or regulating a real-time clock (RTC).

Keypad 816 may any input device that includes a set of buttons arranged, for example, in a block or pad and may bear digits, symbols and/or alphabetical letters. Keypad 816 may be a hardware-based or mechanical-type keypad and/or implemented in software and displayed on, for example, a screen or touch screen to form a keypad. Keypad 816 may receive input from a user that pushed or otherwise activates one or more buttons on keypad 816 to provide input.

Audio interface 818 may be any device capable of providing audio signals from PoS device 800. For example, audio interface may be a speaker or speakers that may produce audio signals. In various embodiments, audio interface 818 may be integrated within PoS device 800. Audio interface 818 also may include components that are external to PoS device 800.

Touchscreen/display control 820 may be any device or controller that controls an electronic visual display. Touchscreen/display control 820 may allow a user to interact with PoS device 800 through simple or multi-touch gestures by touching a screen or display (e.g., display 822). Touchscreen/display control 820 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 820 may receive inputs from the touchscreen and process the received inputs. Touchscreen/display control 820 also may control the display on PoS device 800, thereby providing the graphical user interface on a display to a user of PoS device 800.

Display 822 may be any display suitable for a PoS device. For example, display 822 may be a TFT, LCD, LED, or other display. Display 822 also may be a touchscreen display that for example allows a user to interact with PoS device 800 through simple or multi-touch gestures by touching a screen or display (e.g., display 822). Display 822 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 822 may receive inputs from control gestures provided by a user. Display 822 also may display images, thereby providing the graphical user interface to a user of PoS device 800.

Cash register/retail enterprise system 824 may me any device or devices that cooperate with PoS device 800 to process transactions. Cash register/retail enterprise system 824 may be coupled with other components of PoS device 800 via, for example, a data interface (e.g., data interface 806) as illustrated in FIG. 8. Cash register/retail enterprise system 824 also may be integrated into PoS device 800.

In various embodiments, cash register/retail enterprise system 824 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 824 may comprise a retail enterprise system and/or a customer relationship management system. Retail enterprise system 824 may enable retain enterprises to manage operations and performance across a retail operation. Retail enterprise system 824 may be a stand-alone application in, for example, individual stores, or may be interconnected via a network. Retail enterprise system 824 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 824 also may include inventory control and tracking capabilities, reporting tools, customer management capabilities, employee management tools, and may integrate with other accounting software.

In various embodiments cash register/retail enterprise system 824 may be a hospitality PoS. In such embodiments, retail enterprise system 824 may include hospitality PoS software (e.g., Aloha PoS Restaurant software from NCR®, Micros® RES and Symphony software and the like), hospitality management software. and other hardware and software to facilitate hospitality operations.

Figure 9:
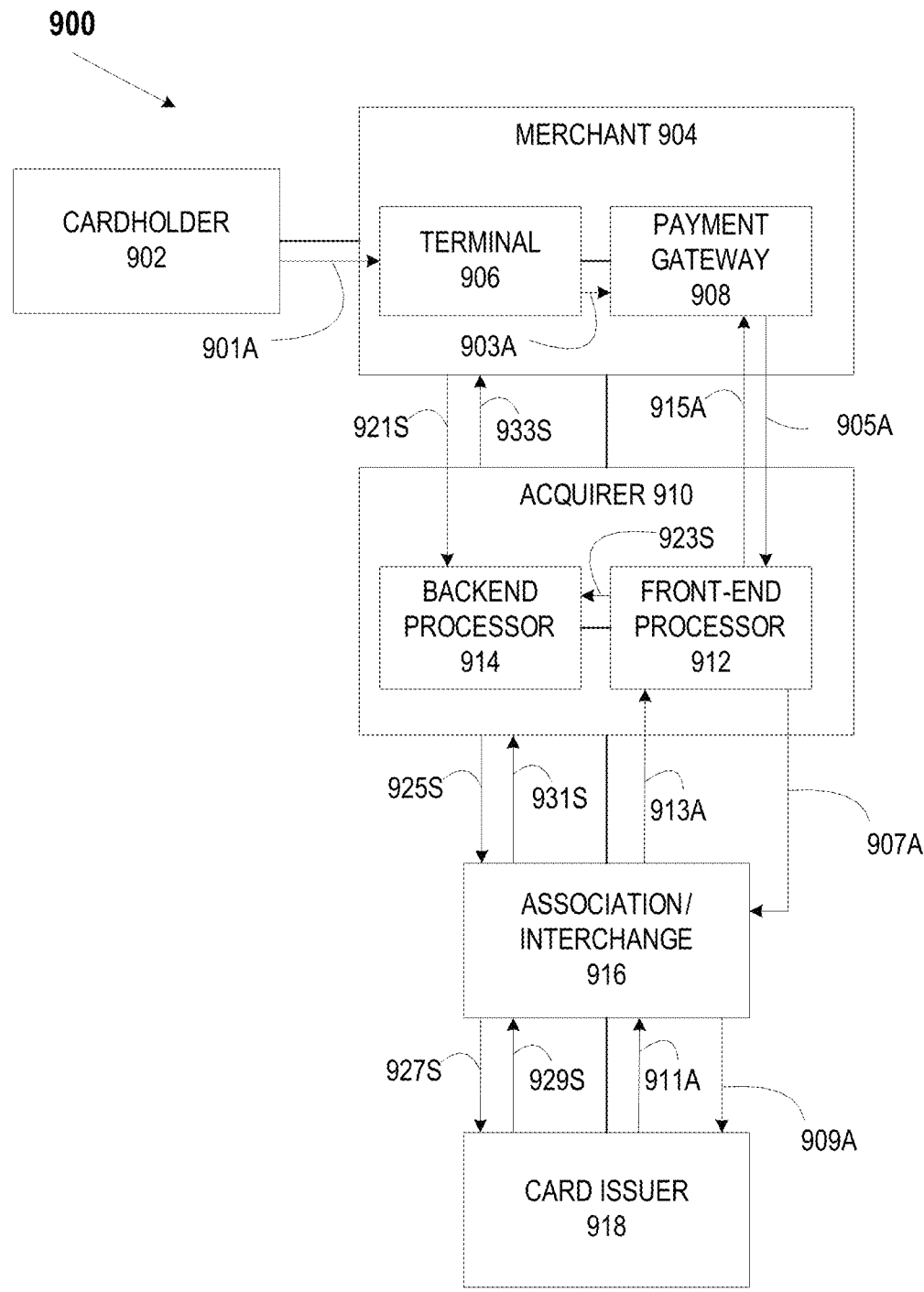
FIG. 9 depicts an example embodiment of a system including a dynamic transaction card according to embodiments of the disclosure.

FIG. 9 illustrates an example system 900 and method for transaction authorization. As shown and described in FIG. 9, account holders, such as account holders associated with a dynamic transaction card similar to dynamic transaction card 120 and/or a mobile device similar to mobile device 140 and financial institutions similar to account provider system 130 may be connected with a card association network to enable secure transactions, timely payments, and successful withdrawals. System 900 may include a cardholder 902, merchant 904, Acquirer 910, Association/Interchange 916, and card issuer 918.

Cardholder 902 may be any account holder, including a credit card holder, debit card holder, stored value card holder and the like. Cardholder 902 may be similar to the card holder associated with dynamic transaction card 120 and/or mobile device 140. Cardholder 902 may possess a plastic card or carry a device (e.g., a mobile device) that securely stores card credentials and is capable of transmitting the card credentials to, for example, a PoS terminal (e.g., terminal 906) and/or an input/output device. Cardholder 902 may interact with a merchant and/or a providing party (e.g., merchant 904) by presenting a transaction card (e.g., dynamic transaction card 120) or card credentials to a terminal (e.g., terminal 906).

Merchant 904 may be any merchant that accepts payment from a cardholder 902 in exchange for goods, for example. Merchant 904 may be any retailer, service provider, business entity, or individual that accepts payments. Merchant 904 may include software, firmware and hardware for accepting and/or processing payments. For example, as illustrated in FIG. 9, merchant 904 may include a terminal 906 and a payment gateway 908. Terminal 906 and payment gateway 908 may comprise the physical or virtual device(s) used by merchant 904 to communicate information to front-end processor 912 of acquirer 910. Terminal 906 may be similar to a PoS system. Terminal 906 may include an EM V card reader to interact with a dynamic transaction card. In various embodiments, payment gateway 908 may be an e-commerce application service provider service that authorizes payments for merchants. As such, payment gateway 908 may be a virtual equivalent of a PoS terminal and interface with, for example, a billing system of merchant 904 and pass data to front-end processor 912 of acquirer 910.

Acquirer 910 may be, for example, a financial institution or bank that holds the contract for providing payment processing services to merchant 904. Merchant 904 may have a merchant account that may serve as a contract under which Acquirer 910 may extend a line of credit to a merchant who wishes to accept, for example, credit card transactions. As shown in FIG. 9, Acquirer 910 may be associated with front-end processor 912 and back-end processor 914.

In various examples, front-end processor 912 may be a platform that card terminal 906 and/or payment gateway 908 communicate with when approving a transaction. Front-end processor 912 may include hardware, firmware, and software to process transactions. Front-end processor 912 may be responsible for the authorization and capture portion of credit card transaction. Front-end processor 912 also may include additional front-end platform interconnections to support, for example, ACH and debit transactions.

Back-end processor 914 may be a platform that takes captured transactions from front-end processor 912 and settles them through an Interchange system (e.g., association/interchange 916). Back-end processor 914 may generate, for example, daily ACH files for merchant settlement. Back-end processor 914 also may handle chargeback handling, retrieval request and monthly statements.

Association/interchange 916 may be the consumer payment system whose members are the financial institutions that issue payment cards and/or sign merchant to accept payment cards. Example associations/interchanges 916 may include, Visa®, MasterCard®, and American Express®. Association/interchange 916 may include one or more computer systems and networks to process transactions.

Issuer 918 may be a financial institution that issues payment cards and maintains a contract with cardholders for repayment. In various embodiments, issuer 918 may issue credit, debit, and/or stored value cards, for example. Example issuers may include, Capital One®, Bank of America®, Citibank®, Sun Trust®, and the like.

In various embodiments, processing a payment card transaction may involve two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 902 may present payment card, such as dynamic transaction card 120, as payment (901A) at merchant 904 PoS terminal 906, for example. Merchant 904 may enter card into a physical PoS terminal 906 (e.g., an EMV terminal) or submit a credit card transaction to a payment gateway 908 on behalf of withdrawing party via a secure connection from a Web site, retail location, or a wireless device.

Payment gateway 908 may receive the secure transaction information (903A) and may pass the secure transaction information (905A) via a secure connection to the merchant acquirer's 910 front-end processor 912.

Front-end processor 912 may submit the transaction (907A) to association/interchange 916 (e.g., a network of financial entities that communicate to manage the processing, clearing and settlement of credit card transactions). Association/interchange 916 may route the transaction (909A) to the customer's Issuer 918. Issuer 918 may approve or decline the transaction and passes the transaction results back (911A) through association/interchange 916. Association/interchange then may relay the transaction results (913A) to front-end processor 912.

Front-end processor 912 may relay the transaction results (915A) back to the payment gateway 908 and/or terminal 906. Payment gateway 908 may store the transaction results and sends them to merchant 904. Merchant 904 may receive the authorization response and complete the transaction accordingly.

During settlement, merchant 904 may deposit the transaction receipt (921S) with acquirer 910 via, for example, a settlement batch. Captured authorizations may be passed (923S) from front-end processor 912 to the back-end processor 914 for settlement. Back-end processor may generate ACH files for merchant settlement. Acquirer may submit settlement files (925S, 927S) to Issuer 918 for reimbursement via association/interchange 916. Issuer 918 may post the transaction and/or withdrawal and pay merchant 904 (929S, 931S, 933S).

FIG. 2 depicts an example dynamic transaction card 200. As shown in FIG. 2, dynamic transaction card 200 may include a top output layer 202. The top output layer may be a film covering, a plastic covering, and/or the like. The top output layer 202 may be constructed of scratch-resistant and/or scratch-proof materials. Materials that may be used as a top outer layer 202 may include polyvinyl chloride (PVC), polylactic acid (PLA), acrylonitrile butadiene styrene (ABS), polyethylene terephthalate (PET), Polyethylene terephthalate glycol-modified (PET-G), polyester film or plastic sheet (e.g., Mylar), polycarbonate (PC), and/or the like. A dynamic transaction card 200 may further include a top protective layer 204, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass, thin film alloys, ITO, ZnO, PVC, PET, BoPET (e.g., Mylar), polyvinylidene fluoride (e.g., Kynar), polyvinylidene difluoride, PC and/or PET-G.

A dynamic transaction card may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the components of card 200. For example, injection molding may include ABS, thermoplastic elastomers (TPE), thermoplastic vulcanizate (TPV), thermoplastic polyurethane (TPU), PET, polycarbonates (PC), cold lamination of the outer films to the body of the card using thermoactive adhesives, hot lamination of the outer films to the body of the card using thermoactive adhesives, and/or silicone. A dynamic transaction card 200 may further include a Java Applet 208 and Java Applet integration 210. Although a Java Applet 208 is used through the specification, any other similar type of code application may be used. Moreover, although Java Applet integration 210 is used throughout this specification, any type of interface may be used to allow the microcontroller to interact with the E/VIV chip. A Java Applet 208 may include code that executes payments, such as payment made using an EMV chip. A Java Applet 208 may include account-provider specific code to execute display functionality specific to the account provider. Java Applet integration 210 may include coded interfaces to allow the microcontroller to interact with the EMV chip 212.

An EMV chip 212 may include a number of contacts that may interact with and/or be connected to a terminal configured to read data stored on a processor of an EMV chip 212. During an EMV transaction, application cryptograms may be used to send and receive data packets between the dynamic transaction card 200 and a terminal, such as a merchant terminal, which may be similar to a terminal included at a merchant 150. For example, data packets may include user authentication information which an acquisition system and/or issuing financial institution may use to authenticate a transaction card 200 during a transaction. Various cryptographic protocols and/or methods may be used in this data transmission and reception process. Moreover, during a transaction issuing financial institutions and/or acquisition systems may return script commands to the EMV chip 212 via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

Dynamic transaction card 200 may also include one or more sensors 214 to receive input. Sensors 214 may include an activation sensor and/or an operation sensor, which may be combined and/or separate. An activation sensor may activate the dynamic transaction card 214 and an operation sensor may instruct the dynamic transaction card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on the dynamic transaction card and/or a password received on a paired mobile device), and/or the like. An operation sensor may change a display 216 based on received input, conduct a transaction via, for example an EMV chip 212 and/or contactless payment technologies based on received input, attempt a pairing of a card 200 and a mobile device, and/or the like.

By way of example, a sensor 214 may include a capacitive touch sensor, a piezoelectric sensor, an inductive sensor, load cells, a light sensor, a temperature sensor, a resistive touchscreen, including for example an analogue matrix real (AMR) sensors, and/or the like. Sensors 214 may include accelerometers and/or photosensors to detect motion input. Although the sensor 214 is depicted at a particular spot in the transaction card 200, a sensor 214 may be placed at any portion of the card to detect, for example, touch, light, heat, energy, and/or the like. For example, a sensor may be placed around the outer edges of a dynamic transaction card 200 or at any spot within the dynamic transaction card 200. Sensor 214 also may include the entire exterior surface of transaction card 200.

A display 216 may be provided within the transaction card 200. Although the display as shown includes, for example, a dot matrix display, a number of other display options may be included in the transaction card 200. For example, lighting, such as LED lighting, OLED lighting, electro luminescent (EL) displays, and/or the like, may be used as display components. Display components may also include electronic paper, Mirasol, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 216 may be illuminated using a particular color to relay to the cardholder balance information of an account associated with a transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 216 may include other display component, such as, for example, LCD technology, ePaper technology (e.g., e-ink), vacuum florescent display technology, and/or the like.

By way of example, a display 216 may include a number of LED or OLED lights and/or light pipes that may be lit in a particular pattern to indicate transaction and/or account information. For example, a display 216 may include a circle, semicircle, or other shape of LED or OLED lighting and/or light pips, where the number of lights illuminated indicates a dollar amount or a percentage of the total spending limit, a particular budget, a particular budget category, and/or the like.

By way of example, a display 216 may be activated via a sensor 214, which may include any type of sensor describe herein. For example, a display may be activated via a touch sensor, where a user is required to tap a location on dynamic transaction card 200 a specific number of times and/or for a specific length of time (e.g., double tap, triple tap, one long tap followed by one short tap, and/or the like). In response to the received sensor input, a display 216 may be activated to display particular data, such as data associated with a transaction history, account balance, spending limit, budget categories, budget spending, budget limits, and/or the like. For example, in response to a user double-tapping a sensor point on dynamic transaction card 200, a number of LED or OLEDs may be illuminated to display the percentage of a budget consumed (e.g., if a budget is $10,000 and a user has spent $3,000, then 3 out of 10 LEDs or OLEDs may be illuminated to illustrate that 30% of the $10,000 budget has been consumed).

A display may be altered and/or modified, for example, depending on which account or card is selected to be used. For example, where dynamic transaction card 200 includes a debit account, a first credit account, and a second credit account, display components 216 may reflect the card number, security code, expiration date, and/or other necessary data indicative of the account (e.g., second credit account) that is being used to execute a transaction. A display may be altered and/or modified when, for example, a dynamic transaction card 200 receives new card data and/or new account data from an account holder's mobile device via a wireless connection. For example, where an account has been marked as associated with fraudulent activity, an account holder and/or issuing financial institution may deactivate the card associated with the account and issue a new card. Accordingly, new card data may be transmitted from the issuing financial institution to, for example, an account holder's mobile device via a network, and then from an account holder's mobile device to dynamic transaction card 200 via a wireless connection. A display may also be altered and/or modified when dynamic transaction card 200 activates a new account. For example, when an account holder applies for a new account (e.g., a new credit card account, a new checking account, and/or the like), if approved, new account data may be transmitted to dynamic transaction card 200. New account data may be received at an account holder's mobile device from an issuing financial institution via a network (e.g., using a mobile application, mobile optimized website, and/or the like). New account data may then be transmitted from an account holder's mobile device to dynamic transaction card 200 via a wireless connection (e.g., BLE, RFID, NFC, WiFi, and/or the like) or a contact connection (e.g., using a terminal in contact with an EMV processor and/or other microchip).

As described herein, card 200 may be fully or partially pre-loaded with account and/or card data. For example, an applet and placeholder data (or actual data) may be stored within dynamic transaction card 200. Accordingly, when an account holder wishes to activate a new account (e.g., account holder who maintains a first credit account may wish to apply for a second credit account), the new account data and/or activation signal may be received from an account holder's mobile device via a wireless connection or a contact connection (e.g., using a terminal in contact with an EMV processor and/or other microchip) and a new account and/or card may be activated and able to be displayed on dynamic transaction card 200.

A dynamic transaction card 200 may include a display driver 218 that translates instructions from a microcontroller 224 into display images to be displayed using display components 216. A display driver 218 may include an integrated circuit (IC), a state machine, and/or the like that provides an interface function between the display and the microcontroller 224. A display driver 218 may include memory (e.g., RAM, Flash, ROM, and/or the like) and/or firmware that includes font display data.

A dynamic transaction card 200 may include firmware 220 and/or a bootloader 222. A bootloader 222 may include code to be executed as a dynamic transaction card 200 is activated and before any operating system, firmware, or other code is executed on the dynamic transaction card 200. A bootloader may be activated via a sensor 214 and energy storage component 228 of the dynamic transaction card 200. Bootloader 222 may be activated and/or load an application and/or program upon detection that card 200 has been inserted into a terminal, charger, and/or the like. Bootloader 222 may be activated using only one technique described herein, using multiple techniques described herein, and/or using a card holder or card provider selected technique(s) described herein. Bootloader 222 may only be active during a short interval after the card 200 powers up. Card 200 may also be activated using program code that may be flashed directly to a microprocessor such as microcontroller 224, EMV processor 212, and/or the like. Card 200 may not use a bootloader 222 but instead may cycle between a sleep state and an active state using program code and/or memory.

A dynamic transaction card 200 may include a microcontroller 224 and an antenna 226. Antenna 226 may include, for example, a loop antenna, a fractal antenna, and/or the like. Antenna 226 may transmit to and receive signals from a mobile device, such as mobile device 140, to conduct transactions and display data as described throughout the specification. Microcontroller 224 may communicate with EMV chip 212, Java Applet 208, Java Applet integration 210, sensor(s) 214, power management 230, antenna 226, energy storage component 228, display 216, display driver 218, firmware 220, bootloader 222, and/or any other component of dynamic transaction card 200. Microcontroller 224 may control the card operations to conduct transactions and/or display data as described throughout this specification.

Dynamic transaction card 200 may include an energy storage component 228. Although energy storage component is depicted as a single component, energy storage component 228 may include a series of energy storage components. By way of example, energy storage component 228 may include a lithium polymer battery, a lithium-metal battery, lithium-ceramic battery, and/or any other type of battery. Energy storage component 228 may be constructed out of rigid materials, semiflexible materials, and/or flexible materials. Energy storage component 228 may provide power to card components contained within dynamic transaction card 200. Energy storage component 228 may be a combine, for example, a battery/potting component to support dynamic transaction card 200.

Dynamic transaction card 200 may include a power management component 230 that may manage the charging and discharging of energy storage component 228. Power management component 230 may convert voltage to a predetermined level in order to operate dynamic transaction card 200 as discussed throughout the specification. Power management component 230 and/or energy storage 228 may include, for example, solar power cells to convert solar energy into an electrical current within a solar panel. Power management component 230 and/or energy storage component 228 may include connections to sensors 214 to receive input and activate dynamic transaction card 200 (e.g., motion input, thermal input, manual input, touch input, and/or the like).

A flexible printed circuit board (PCB) 232 may be included in dynamic transaction card 200. A flexible PCB 232 may include a PCB mounted in a flexible plastic substrate, such as for example, a polyimide, polyether ether ketone, and/or a transparent conductive polyester film. A flexible PCB 232 may be printed, using, for example screen printing, 3D printing, and/or the like, to arrange circuits on a material, such as polyester. Flexible PCB may include electronic components and connections that power dynamic transaction card 200. Flexible PCB 232 may control and/or provide integration between the components of card 200. For example, flexible PCB 232 mechanically supports and electronically connects the electronic components of card 200 using, for example, conductive tracks, pads, and/or other features. PCB 232 may be combined with an energy component (e.g., battery component, power component, etc.) as described in U.S. Patent Application No. 62/266,324, the entire content of which are incorporated herein by reference. A flexible PCB may also provide antenna support. A flexible printed circuit (FPC) may be used in place of or in conjunction with flexible PCB 232. FPC 232 may be fabricated with photolithographic technology, such as light exposure of a film material laminated to substrate and/or conductive layers. FPC 232 may be printed, silkscreened, and/or the like. FPC 232 may be used as a structural member for the electronic components of card 200 and/or for the card system as a whole 200. Dynamic transaction card 200 may include a chassis 234 as a frame or supporting structure. Chassis 234 may be a mount for a flexible PCB 232 and may be constructed out of flexible or semi-flexible material as well. Chassis 234 may be constructed out of a number of materials, including but not limited to, PVC, PC, ABS, styrene, polycarbonate, polyester, PET, any material that is easily molded, deposited, or laser cut (e.g., organic or inorganic material such as paper, plastic, and/or engineered ceramics), and/or the like. Chassis 234 may be constructed out of a conductive material. Chassis 234 may increase the rigidity of dynamic transaction card 200 to prevent damage. Chassis 234 may also be used to detect if dynamic transaction card 200 is being held by including sensors 214 around chassis 234. Where chassis 234 is constructed out of a conductive material, a dielectric constant of chassis 234 and/or card 200 may be monitored to detect handling of card 200. A chassis 234 may be used to detect the handling of card 200 via a strain gauge. Chassis 234 may be included within or separate from a card backing 236. Card backing 236 may include a magnetic stripe that may be read using a magnetic stripe reader. A magnetic stripe may store tracks of data that are used to conduct a transaction using a dynamic transaction card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, a dynamic transaction card 200 that is paired to a mobile device via, for example, Bluetooth, BLE, RFID, WiFi Direct and/or other wireless technologies, may receive new track data. The new track data may be unformatted, encrypted, encoded, and/or the like when the new track data is transmitted from the mobile device to the dynamic transaction card 200. Upon receipt of the new track data, the new track data may be routed to a microprocessor, such the processor of EMV chip 212 and/or microcontroller 224. EMV chip 212 and/or microcontroller 224 may convert, decrypt, and/or decode the received new track data to ensure compliance with any standards. Once decrypted, decoded, and/or formatted, the new track data may be saved on the tracks of the magnetic stripe. The magnetic stripe may be deleted and then the new track data may be recorded onto the tracks. In this manner, track data stored on a magnetic stripe may be altered at any time upon pairing a dynamic transaction card 200 with a mobile device.

Card backing 236 may be made of similar material to that of the output layer 202 and/or the top protective layer 204. Card backing 236 may be made out of a plastic material.

Although the components of dynamic transaction card 200 are illustrated in a particular fashion, these components may be combined and or placed throughout a dynamic transaction card 200 in any manner, such as those depicted in, for example, FIG. 7.

For example, FIG. 7 illustrates a dynamic transaction card having an output layer 702 which may be similar to output layer 202; an outer protective layer 704 which may be similar to outer protective layer 204; potting 706 which may be similar to potting 206; Java Applets 708 which may be similar to Java Applets 208; Java Applet integration 710 which may be similar to Java Applet integration 210; an EMV chip 712 which may be similar to EMV chip 212; a sensor 714 which may be similar to sensor 214; display 71.6 which may be similar to display 216; display driver 718 which may be similar to display driver 718; firmware 720 which may be similar to firmware 220; bootloader 722 which may be similar to bootloader 222; microcontroller 724 which may be similar to microcontroller 224; antenna 726 which may be similar to antenna 226; energy storage component 728 which may be similar to energy storage component 228; power management 730 which may be similar to power management 230; a flexible PCB 732 which may be similar to flexible PCB 232; chassis 734 which may be similar to chassis 234; and/or card backing 736 which may be similar to card backing 236.

Figure 3:
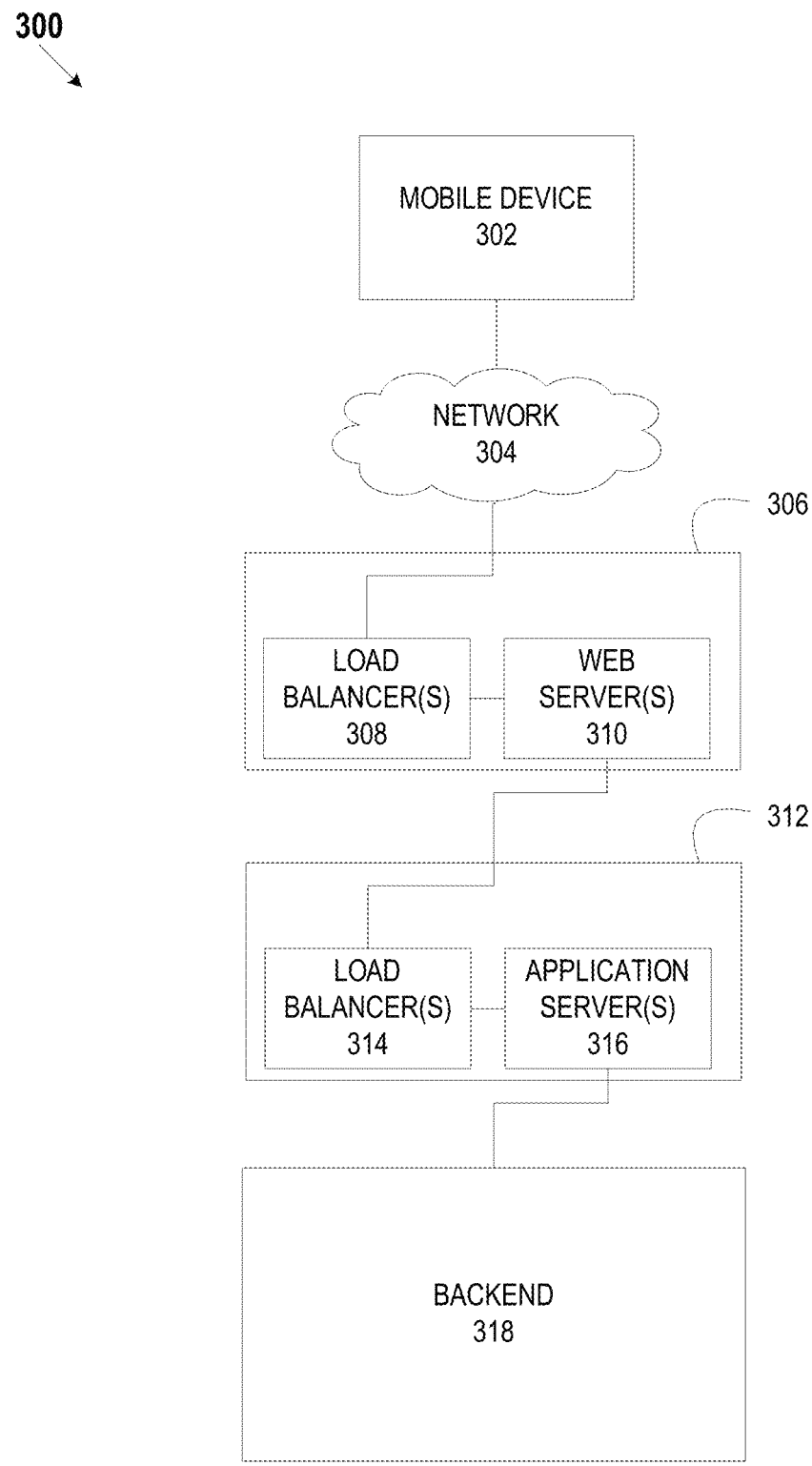
FIG. 3 depicts an example embodiment of a system including a dynamic transaction card according to embodiments of the disclosure.

FIG. 3 illustrates a system associated with the use of a dynamic transaction card. The example system 300 in FIG. 3 may enable a financial institution, for example, to provide network services to its cardholders, and may include providing transaction card data, account data, and/or any other data to a mobile device that may in turn provide that data to a dynamic transaction card. For example, referring to FIGS. 1 and 3, a financial institution may include a front-end controlled domain 306, a back-end controlled domain 312, and a backend 318 as part of account provider system 130, a mobile device 302 may include mobile device 140, and a dynamic transaction card may include dynamic transaction card 120. Referring to FIGS. 3 and 9, for example, a dynamic transaction card may be similar to a dynamic transaction card of cardholder 902; a financial institution may include a front-end controlled domain 306, a back-end controlled domain 312, and a backend 318 as part of card issuer system 918 and/or association/interchange 916; and a mobile device may be similar to a mobile device of cardholder 902. The example system 300 also may enable a merchant, for example, to provide network services to its customers, and may include providing sales, loyalty account data, and/or any other data to a mobile device that may in turn provide that data to a dynamic transaction card. For example, a mobile device 302 and/or dynamic transaction card may interact with a merchant system, such as merchant system 800 of FIG. 8 via a reader 808, 810, 812 to send and/or receive data to the merchant system, which may interact with a financial institution over a network, where a financial institution may include a front-end controlled domain 306, a back-end controlled domain 312, and a backend 318.

As shown in FIG. 3, system 300 may include a mobile device 302, a network 304, a front-end controlled domain 306, a back-end controlled domain 312, and a backend 318. Front-end controlled domain 306 may include one or more load balancers 308 and one or more web servers 310. Back-end controlled domain 312 may include one or more load balancers 314 and one or more application servers 316.

Mobile device 302 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 300 may execute one or more software applications to enable, for example, network communications.

Mobile device 302 may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. Mobile device 302 also may be similar to mobile device 140 as shown and described in FIG. 1.

Network 304 may be one or more of a wireless network, a wired network, or any combination of a wireless network and a wired network. For example, network 304 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 304 may include, without limitation, telephone lines, fiber optics, IEEE Ethernet 902.3, a wide area network (WAN), a local area network (LAN) or a global network such as the Internet. Also, network 304 may support an Internet network, a wireless communication network, a cellular network, or the like, or any combination thereof. Network 204 may further include one network, or any number of example types of networks mentioned above, operating as a stand-alone network or in cooperation with each other. Network 304 may utilize one or more protocols of one or more network elements to which they are communicatively couples. Network 304 may translate to or from other protocols to one or more protocols of network devices. Although network 304 is depicted as a single network, it should be appreciated that according to one or more embodiments, network 304 may comprise a plurality of interconnected networks, such as, for example, the Internet, a service provider's network, a cable television network, corporate networks, and home networks.

Front-end controlled domain 306 may be implemented to provide security for backend 318. Load balancer(s) 308 may distribute workloads across multiple computing resources, such as, for example computers, a computer cluster, network links, central processing units or disk drives. In various embodiments, load balancer(s) 310 may distribute workloads across, for example, web server(s) 316 and/or backend 318 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 308 may include software that monitoring the port where external clients, such as, for example, mobile device 302, connect to access various services of a financial institution, for example. Load balancer(s) 308 may forward requests to one of the application servers 316 and/or backend 318 servers, which may then reply to load balancer 308. This may allow load balancer(s) 308 to reply to mobile device 302 without mobile device 302 ever knowing about the internal separation of functions. It also may prevent mobile devices from contacting backend servers directly, which may have security benefits by hiding the structure of the internal network and preventing attacks on backend 318 or unrelated services running on other ports, for example.

A variety of scheduling algorithms may be used by load balancer(s) 308 to determine which backend server to send a request to. Simple algorithms may include, for example, random choice or round robin. Load balancers 308 also may account for additional factors, such as a server's reported load, recent response times, up/down status (determined by a monitoring poll of some kind), number of active connections, geographic location, capabilities, or how much traffic it has recently been assigned.

Load balancers 308 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 310 may include hardware (e.g., one or more computers) and/or software (e.g., one or more applications) that deliver web content that can be accessed by, for example a client device (e.g., mobile device 302) through a network (e.g., network 304), such as the Internet. In various examples, web servers, may deliver web pages, relating to, for example, online banking applications and the like, to clients (e.g., mobile device 302). Web server(s) 310 may use, for example, a hypertext transfer protocol (HTTP/HTTPS or sHTTP) to communicate with mobile device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 310 may respond with the content of that resource or an error message if unable to do so. The resource may be, for example a file on stored on backend 318. Web server(s) 310 also may enable or facilitate receiving content from mobile device 302 so mobile device 302 may be able to, for example, submit web forms, including uploading of files.

Web server(s) also may support server-side scripting using, for example, Active Server Pages (ASP), KIP, or other scripting languages. Accordingly, the behavior of web server(s) 310 can be scripted in separate files, while the actual server software remains unchanged.

Load balancers 314 may be similar to load balancers 308 as described above.

Application server(s) 316 may include hardware and/or software that is dedicated to the efficient execution of procedures (e.g., programs, routines, scripts) for supporting its applied applications. Application server(s) 316 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 316 may act as a set of components accessible to, for example, a financial institution, or other entity implementing system 300, through an API defined by the platform itself. For Web applications, these components may be performed in, for example, the same running environment as web server(s) 310, and application servers 316 may support the construction of dynamic pages. Application server(s) 316 also may implement services, such as, for example, clustering, fail-over, and load-balancing. In various embodiments, where application server(s) 316 are Java application servers, the web server(s) 316 may behaves like an extended virtual machine for running applications, transparently handling connections to databases associated with backend 318 on one side, and, connections to the Web client (e.g., mobile device 302) on the other.

Backend 318 may include hardware and/or software that enables the backend services of, for example, a financial institution, merchant, or other entity that maintains a distributed system similar to system 300. For example, backend 318 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 318 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), and the like. Backend 318 also may be associated with one or more servers that enable the various services provided by system 300. Backend 318 may enable a financial institution to implement various functions associated with reprogramming a transaction card and/or providing data to a transaction card in order to provide a dynamic display as shown and described herein.

A dynamic display may be a display that is altered by activating new card data such as, a new card number, a new security code (e.g., CCV code), a new expiration date, and/or other card/account data. A dynamic display may be a display that is altered by activating new account data, such as a new account number, a new card number, a new security code, a new expiration date, and/or other card/account data. New account and/or new card data may be fully pre-loaded, partially pre-loaded, and/or received from a wireless connection.

For example, fully pre-loaded data may include a full account number, card number, security code, expiration date, and/or other account data that is loaded onto a dynamic transaction card (e.g., dynamic transaction card 200, 700) upon personalization at a backend facility. Fully pre-loaded data may also include an associated applet that interacts with the account and/or card data to execute transactions, manipulate dynamic displays, and/or perform any of the functionality described herein. Fully pre-loaded data may be activated upon receiving an activation signal from, for example, an account holder device via a wireless connection. A wireless device may receive an activation signal from an issuing financial institution via a network connection using, for example, a mobile application and/or mobile-enhanced website associated with the issuing financial institution.

Partially pre-loaded data may include a shell account that includes a placeholder for each type of data required for a fully-functional account (e.g., account holder data, account number, security code, expiration date, and/or the like). A placeholder may include one or more alphanumeric characters associated with inactive, null, or shell accounts in a backend system associated with the issuing financial institution. Partially pre-loaded data may include an associated applet that interacts with the account and/or card data to execute transactions, manipulate dynamic displays, and/or perform any of the functionality described herein. Partially pre-loaded data may be activated upon receiving an activation signal and/or new card or new account data from, for example, an account holder device via a wireless connection or a contact connection (e.g., using a terminal in contact with an EMV processor and/or other microchip). A wireless device may receive an activation signal and/or new card or new account data from an issuing financial institution via a network connection using, for example, a mobile application and/or mobile-enhanced website associated with the issuing financial institution.

Data transmitted may be encrypted. Encryption/decryption may occur using a key that was preloaded onto the dynamic transaction card upon personalization at the issuing financial institution and/or a key preloaded to an EMV circuit. Data received may include new account and/or card data. For example, where partially pre-loaded card and/or account data are stored on a dynamic transaction card, new card and/or account data may be received from an account holder's mobile device via a wireless connection (e.g., BLE, NFC, WiFi, and/or the like) or a contact connection (e.g., using a terminal in contact with an EMV processor and/or other microchip). Data received may include an applet and/or applet data required to execute transactions, manipulate dynamic displays, and/or perform any of the functionality described herein.

Also, fully pre-loaded and/or partially pre-loaded data may also include keys (e.g., public/private key pairs, private key pairs, and/or the like) that may be used by an EMV circuit to execute transactions using the EMV processor on the card.

Figure 4:
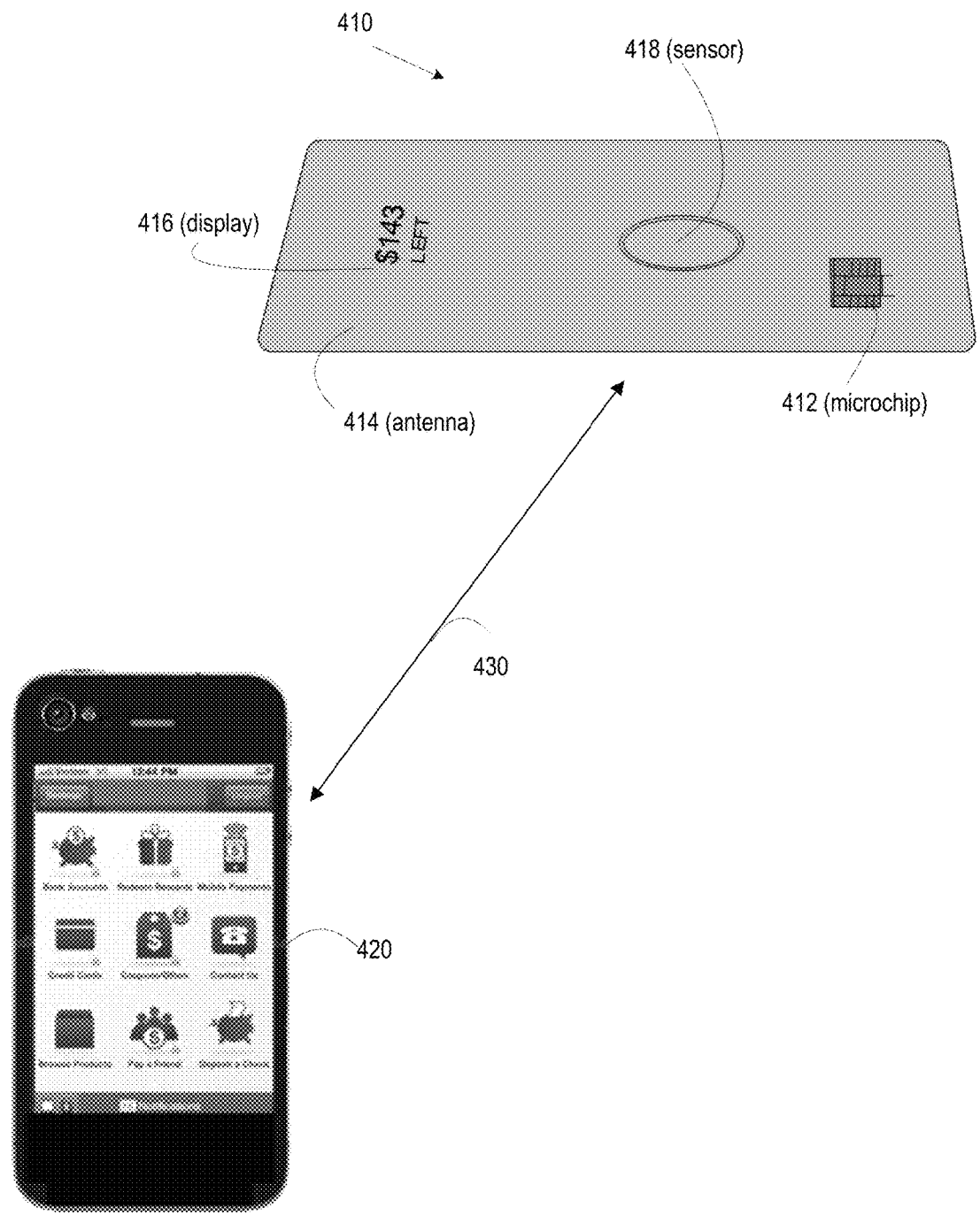
FIG. 4 depicts an example card-device linking system according to embodiments of the disclosure.

FIG. 4 illustrates a system associated with the use of a dynamic transaction card. The example system 400 in FIG. 4 may enable a mobile device 420 storing a mobile banking application, for example, to provide data updates to a dynamic transaction card 410 via network 430. For example, data received at mobile device 420 may be transmitted to dynamic transaction card 410 where it is received via antenna 414. Data may be received and/or transmitted using, for example a mobile banking application that maintains and/or creates a secure connection with a financial institution to send and/or receive data related to an account associated with the financial institution. For example, a mobile banking application may include send and/or receive data related to a credit account, a debit account, a prepaid account, a loyalty account, a rewards account, and/or the like. Data may also include track data that may be updated upon demand.

Upon activation of dynamic transaction card via, for example, a sensor 418, a data request may be transmitted to a mobile device 420 for updated information, where mobile device 420 may request updated data from a financial institution (not shown) as described in FIG. 3. Data received at dynamic transaction card 410 may be stored on microchip 412 and/or may be displayed via display 416.

Figures 5, 6:
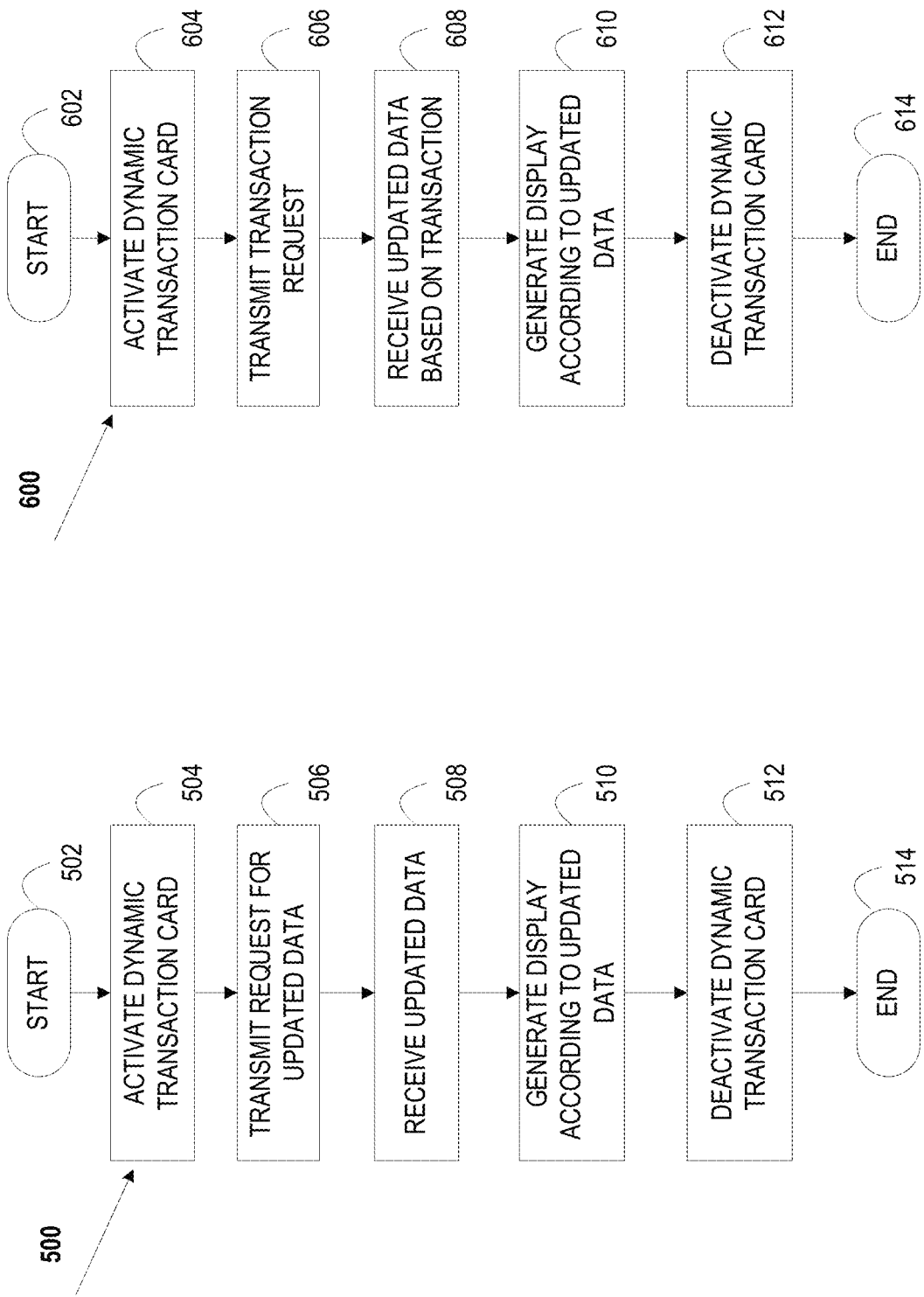
FIG. 5 depicts an example method for using a dynamic transaction card according to embodiments of the disclosure.
FIG. 6 depicts an example method for using a dynamic transaction card according to embodiments of the disclosure.

For example, FIGS. 5 and 6 illustrate example methods of updating and using a dynamic transaction card. The method 500 may start at block 502. At block 504, a dynamic transaction card may be activated. A dynamic transaction card may be activated via input received at a sensor on the dynamic transaction card (e.g., an accelerometer, a light sensor, a capacitive touch sensor, a heat sensor, and/or the like), by inserting the dynamic transaction card into a reader, such as an EMV reader where the EMV reader connects with the dynamic transaction card via an EMV chip, when the dynamic transaction card is being used in a contactless payment transaction (e.g., by received a signal from a PoS terminal that a transaction has been initiated), via an activation signal received from a mobile device (e.g., a signal received from a mobile device that has been paired to the dynamic transaction card via, for example Bluetooth or BLE), and/or the like.

At block 506, upon activation, a dynamic transaction card may request updated data via, for example, a mobile device, an EMV terminal, and/or any computing device capable of communicating with a financial institution. A request may be transmitted wirelessly, using Bluetooth, Bluetooth Low Energy (BLE), RFID, WiFi Direct, and/or NFC technologies. A request may be transmitted via contacts, such as EMV contacts. For example, a request may be processed using the systems described in FIGS. 1, 2, 3, 7, 8, and 9. For example, as illustrated in FIG. 3, a mobile device 302 may send data to and receive data from a financial institution, for example, through a network 304 using a number of load balancers 308, 314 a web server 310, an application server 316, and/or a backend server 318. In this manner, data may be securely transmitted between a mobile device 302 and a financial institution. Moreover, a mobile banking application and/or a financial institution application may provide a secure connection and/or security features (e.g., cryptographic keys, protocol, hash algorithm, digital signatures, passwords, checksums, and/or the like) to conduct secure communications with a financial institution backend and receive updated financial data to transmit, via RF1D, BLE, Bluetooth, NFC, and/or the like, to a dynamic transaction card for storage and/or display.

At block 508, data updates, such as transaction data, transaction history, account balance, account limit, budget category, remaining budget amount, spending per category, and/or like may be received at the dynamic transaction card via an antenna, such as antenna 224, or contact points of an EMV chip, such as EMV chip 212. Data updates may be stored within the dynamic transaction card and recalled on the dynamic transaction card at any time upon activation. For example, a dynamic transaction card may store data in storage associated with a microcontroller such as microcontroller 224, an EMV chip such as E/V1V chip 212, and or software storage (e.g., firmware and/or an application) such as 220, 208 in the dynamic transaction card.

At block 510 a dynamic transaction card may generate a display account to the updated data using a display such as display 216, display driver such as display driver 218, and/or other components of a dynamic transaction card, including, for example, firmware, such as firmware 220 and/or applications, such as application 208. For example, a dynamic transaction card with a dot matrix display may generate an alphanumeric display indicative of the updated data, such as a balance amount, a transaction amount, a budget amount, a transaction date, account holder name, account number, transaction card number, expiration date, account holder data, a spending limit, and/or the like. When a dynamic transaction card display includes and LED and/or an OLED display, a dynamic transaction card may generate a display pattern with the LED and/or OLED lights indicative of the updated data.

By way of example, as displayed in FIG. 2, a display may indicate an amount remaining in an account (e.g., $143 left). A display may include a shape, such as a circle, a ring, and/or the like, indicative of an account balance, a budget balance, and/or the like where a portion of the shape is illuminated to indicate an account balance against an account limit. For example, where a spending limit or budgeted amount is $500 and a balance or amount spent is $100, the shape may be illuminated to indicate 20% of the spending limit or budgeted amount has been spent. In this example, the shape may be illuminated to indicate 80% of the spending limit or budgeted amount has not been spent. In another example, various colors and/or patterns may be illuminated to indicate an amount spent and/or an amount not spent to a card holder (e.g., an LED or OLED patterns and/or colors, edge lighting patterns, and/or the like).

At block 512, a dynamic transaction card and/or display on a dynamic transaction card may be deactivated. Deactivation may occur after a certain amount of time after activation. Deactivation may occur by receiving a predetermined input via a sensor. For example, a first input to a sensor may activate a dynamic transaction card and a second input to a sensor may deactivate a dynamic transaction card. A predetermined input pattern also may deactivate a dynamic transaction card. Deactivation may occur by removing a dynamic transaction card from a terminal. Deactivation may occur when a dynamic transaction card is unpaired from a mobile device. For example, when a dynamic transaction card is over a predetermined distance from a mobile device, a wireless connection (e.g., BLE, Bluetooth, RFID, NFC, WiFi Direct, and/or the like) may be lost and the dynamic transaction card and mobile device may become unpaired. Deactivation may occur upon receiving an input that a mobile device and financial institution have ceased connection. For example, when an account holder logs into a mobile banking application on a mobile device, the account holder may log out or a connection may timeout. Once a connection is lost, either via a log out or timeout, a mobile device may transmit a signal to a dynamic transaction card wirelessly via BLE, Bluetooth, RFID, NFC, WiFi Direct, and/or the like to deactivate the display on the dynamic transaction card. Upon deactivation, the method 500 may end.

The method 600 may start at block 602. At block 604, a dynamic transaction card may be activated. A. dynamic transaction card may be powered up or activated via input received at a sensor on the dynamic transaction card (e.g., an accelerometer, a light sensor, a capacitive touch sensor, a heat sensor, and/or the like), by inserting the dynamic transaction card into a reader, such as an EMV reader where the EMV reader connects with the dynamic transaction card via contact points of an EMV chip, when the dynamic transaction card is being used in a contactless payment transaction (e.g., by received a signal from a PoS terminal that a transaction has been initiated), via an activation signal received from a mobile device (e.g., a signal received from a mobile device that has been paired to the dynamic transaction card via, for example Bluetooth, 131.E, NFC, WiFi Direct, RFID, and/or the like), and/or the like.

At block 606, upon activation, a dynamic transaction card may transmit a transaction request to a point-of-sale (PoS) terminal at a merchant, similar to merchant 150. For example, a dynamic transaction card may interact with a merchant terminal (e.g., FIG. 9, 906) to initiate a transaction. A dynamic transaction card may communicate wirelessly (e.g., RFID, NFC, BLE, WiFi Direct) or using a contact connection (e.g., an EMV processor connection at a terminal) with a merchant terminal. To initiate a transaction, a cardholder may select a specific card to use for a transaction. For example, a dynamic transaction card may store a number of different accounts (e.g., debit account, credit account, prepaid card account, gift card account, and/or the like). A dynamic transaction card may also store a specific applet that executes with each account and an account identifier (AID) associated with the account and/or applet. Accordingly, a cardholder may select which account to use for a transaction, either via a dynamic transaction card interface or via a mobile device application that may communicate wirelessly with a dynamic transaction card to relay transaction instructions (e.g., use credit account, use debit account, and/or the like).

Also, a cardholder may preselect which account to use for specific transactions by setting up account rules (e.g., use credit account to maximize rewards, use debit account when credit balance is at a predetermined level, use credit account at a specific merchant type, and/or the like). Account rules may be stored on a dynamic transaction card and/or an account holder's mobile device (which may then be pushed to a dynamic transaction card at the time a transaction is initiated).

Upon transmitting a transaction request and/or upon receiving transaction approval, a dynamic transaction card may receive updated data based on the current transaction at block 608. Updated data may include the transaction amount, an account balance prior to the transaction, an account balance after transaction approval, an account number, account holder data, budget category, remaining budget amount, spending per category, and/or the like. Data updates may be stored within the dynamic transaction card and recalled on the dynamic transaction card at any time upon activation. For example, a request may be processed using the systems described in FIGS. 1, 2, 3, 7, 8, and 9. For example, as illustrated in FIG. 3, a mobile device 302 may send data to and receive data from a financial institution, for example, through a network 304 using a number of load balancers 308, 314 a web server 310, an application server 316, and/or a backend server 318. In this manner, data may be securely transmitted between a mobile device 302 and a financial institution. Moreover, a mobile banking application and/or a financial institution application may provide a secure connection and/or security features (e.g., cryptographic keys, protocol, hash algorithm, digital signatures, passwords, checksums, and/or the like) to conduct secure communications with a financial institution backend and receive updated financial data to transmit, via RFID, BLE, Bluetooth, NFC, and/or the like, to a dynamic transaction card for storage and/or display.

At block 610 a dynamic transaction card may generate a display account to the updated data using a display, display driver, and/or other components of a dynamic transaction card. For example, a dynamic transaction card with a dot matrix display may generate an alphanumeric display indicative of the updated data, such as a balance amount, a transaction amount, a budget amount, a transaction date, account holder name, account number, transaction card number, expiration date, account holder data, a spending limit, and/or the like. When a dynamic transaction card display includes and LED and/or an OLED display, a dynamic transaction card may generate a display pattern with the LED and/or OLED lights indicative of the updated data.

At block 612, a dynamic transaction card may be deactivated. Deactivation may occur after a certain amount of time after activation. Deactivation may occur by receiving a predetermined input via a sensor. For example, a first input to a sensor may activate a dynamic transaction card and a second input to a sensor may deactivate a dynamic transaction card. A predetermined input pattern also may deactivate a dynamic transaction card. Deactivation may occur by removing a dynamic transaction card from a terminal. Upon deactivation, the method 600 may end.

Figure 10:
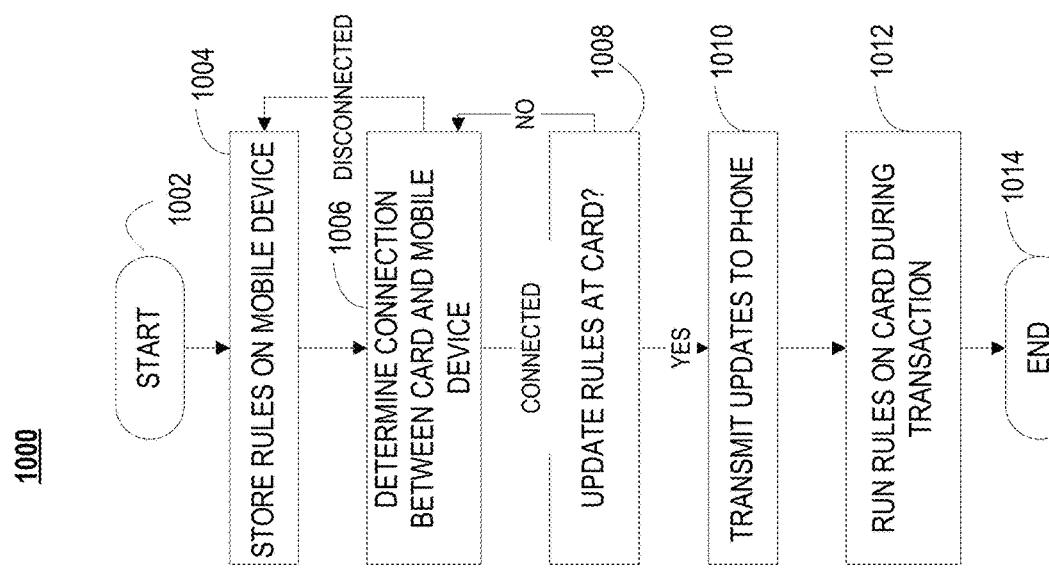
FIG. 10 depicts an example embodiment of a method including a dynamic transaction card according to embodiments of the disclosure.

As another example, FIG. 10 illustrates an example method 1000 of communication between a dynamic transaction card and, for example, a mobile device. Dynamic transaction card may be similar to, for example, dynamic transaction card 200 or dynamic transaction card 700. Mobile device may be similar to, for example, mobile device 140.

At block 1002, the method may begin. At block 1004, an account holder and/or financial institution may store transaction rules associated with a dynamic transaction card on a mobile device. Transaction rules may include for example, rules pertaining to allowing or denying transactions based on a purchase amount, the time of day, the date, the day of the week, the merchant, the geographical location of the transaction, the type of merchant, and/or the like.

At block 1006, a dynamic transaction card and/or mobile device may determine whether a connection exists between a dynamic transaction card and a mobile device. For example, a connection may be made by pairing a dynamic transaction card and a mobile device using NFC, BLE, Bluetooth, RFID, WiFi Direct, and/or other connection technologies.

When a connection is detected, a mobile device may receive a request for updated rules from a dynamic transaction card at block 1008. Rules may be updated on a dynamic transaction card in response to receiving a request from the dynamic transaction card. In another example, rule updates at a dynamic transaction card may occur when a dynamic transaction card requests balance information from a mobile device. Rule updates may occur every time a dynamic transaction card is activated or wakes up and receives additional updated information, such as location information, transaction information. and/or the like Where no request and/or transmission of updated rules occurs at a mobile device, a mobile device may check a connection between a dynamic transaction card and a mobile device. (block 1006).

At block 1010, the updated rules may be transmitted from the mobile device to the dynamic transaction card via, for example, NFC, BLE, Bluetooth, RFID, WiFi Direct, and/or other technologies. Updates may be transmitted as a full reset of transaction rules thereby replacing the transaction rules previously stored on the dynamic transaction card. Updates may be transmitted as the changes between the current transaction rules stored on a dynamic transaction card and the updated transaction rules stored on a mobile device.

At block 1012, updated transaction rules may be stored in a microcontroller, microprocessor, and/or other element of a dynamic transaction card and run during a transaction prior to transmitting any data to an authorization network and/or financial institution. This method is further illustrated in FIG. 11.

Figure 11:
FIG. 11 depicts an example embodiment of a method including a dynamic transaction card according to embodiments of the disclosure.

For example, FIG. 11 also illustrates a method for communication between a financial institution, mobile device, and/or dynamic transaction card. For example, a mobile device may communicate with a financial institution to transmit and validate a set of transaction rules.

The method 1100 of FIG. 11 may begin at block 1102. At block 1104, a card holder may define a set of transaction rules, such as rules that define when a transaction card may be used in a transaction. A set of rules may be defined on, for example, an Internet connected device and/or a mobile device, such as mobile device 140, using a mobile application and/or a website.

At block 1106, the transaction rules may be transmitted from a mobile device and/or Internet connected device to a financial institution associated with the transaction card for which transaction rules are device, where the backend system of the financial institution may be stored and validated. Upon validation, a financial institution system may transmit validated transaction rules to a mobile device associated with the transaction card at block 1108. A financial institution system may store an association between a transaction card and a mobile device. For example, a financial institution system may store a link between a mobile device identifier (e.g., mobile device number, mobile device carrier, mobile device application identifier, device UUID, device UDID), an account identifier (e.g., account holder name, account holder username, account number, and/or the like) and a transaction card (e.g., transaction card identifier, transaction card number, and/or the like). Accordingly, a financial institution, using the information linking a mobile device identifier, account identifier, and a transaction card, a financial institution may transmit validated transaction rules to a mobile device that may be paired with the transaction card associated with the validated transaction rules.

At block 1106, the transaction rules may be transmitted from a mobile device and/or Internet connected device to a financial institution associated with the transaction card for which transaction rules are device, where the backend system of the financial institution may be stored and validated. Upon validation, a financial institution system may transmit validated transaction rules to a mobile device associated with the transaction card at block 1108. A financial institution system may store an association between a transaction card and a mobile device. For example, a financial institution system may store a link between a mobile device identifier (e.g., mobile device number, mobile device carrier, mobile device application identifier, device UUED, device UDID), an account identifier (e.g., account holder name, account holder username, account number, and/or the like) and a transaction card (e.g., transaction card identifier, transaction card number, and/or the like). Accordingly, a financial institution, using the information linking a mobile device identifier, account identifier, and a transaction card, a financial institution may transmit validated transaction rules to a mobile device that may be paired with the transaction card associated with the validated transaction rules.

At block 1112, the validated transaction rules may be stored on a microcontroller, microprocessor, and/or other storage on a dynamic transaction card, which may be similar to dynamic transaction card 200 and/or dynamic transaction card 700.

At block 1114, a dynamic transaction card may be used in a transaction. For example, a microcontroller, microprocessor, and/or other component of the dynamic transaction card may receive transaction details by observing EMV traffic at the EMV processor/contacts of the dynamic transaction card. A microcontroller, microprocessor and/or other element of the dynamic transaction card may execute the stored validated rules to determine if a transaction may occur. For example, a purchase that does not comply with the validated transaction rules may be denied or a purchase that complies with the validated transaction rules may be affirmed by the rules before any purchase data is transmitted to an authorization system and/or a financial institution system.

At block 1116, the microcontroller, microprocessor, and/or other element of the dynamic transaction card that executes the validated transaction rules may transmit the transaction determination to the EMV processor via EMV contacts of the dynamic transaction card, which may interact with a reader at a PoS device to relay the transaction determination to the PoS device. If the determination is to deny the transaction, the PoS device will no longer proceed with the transaction and the method may end. If the determination is to affirm the transaction, a PoS device may continue processing the transaction, which may include, for example, transmitting transaction information to an authorization system and/or financial institution system as described herein.

At block 1118, the method may end. Where, in the methods of FIGS. 10 and 11, a mobile device and a transaction card are not able to be paired (e.g., the mobile device lacks power, NFC/BLE/Bluetooth/WiFi Direct technologies are disabled, and/or the like), a dynamic transaction card may detect that no connection exists between the dynamic transaction card and a mobile device and may instruct a microcontroller, microprocessor, EMV processor, and/or other component of the dynamic transaction card to handle transactions without using validated rules on the dynamic transaction card.

Figure 12:
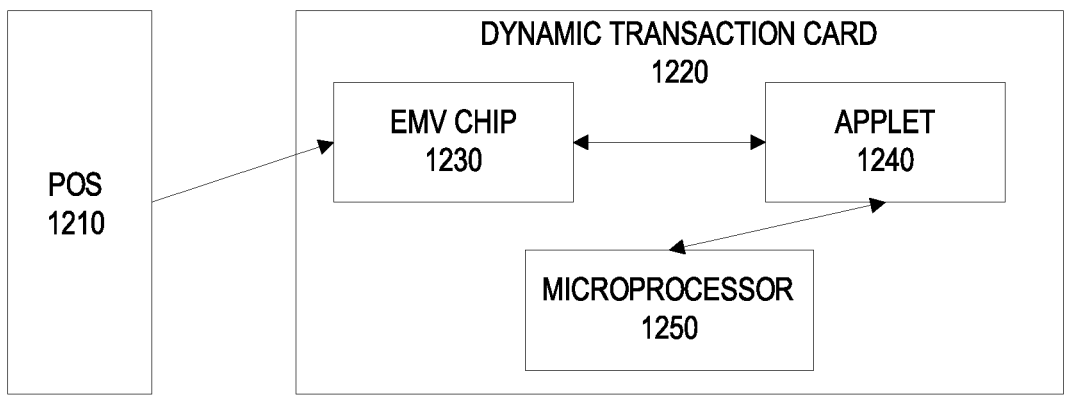
FIG. 12 depicts an example embodiment of a system including a dynamic transaction card according to embodiments of the disclosure.
Figure 13:
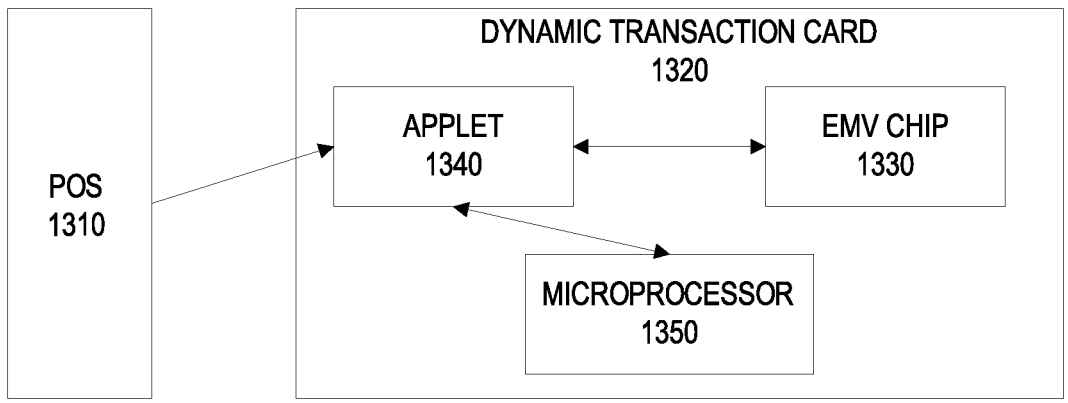
FIG. 13 depicts an example embodiment of a system including a dynamic transaction card according to embodiments of the disclosure.
Figure 14:
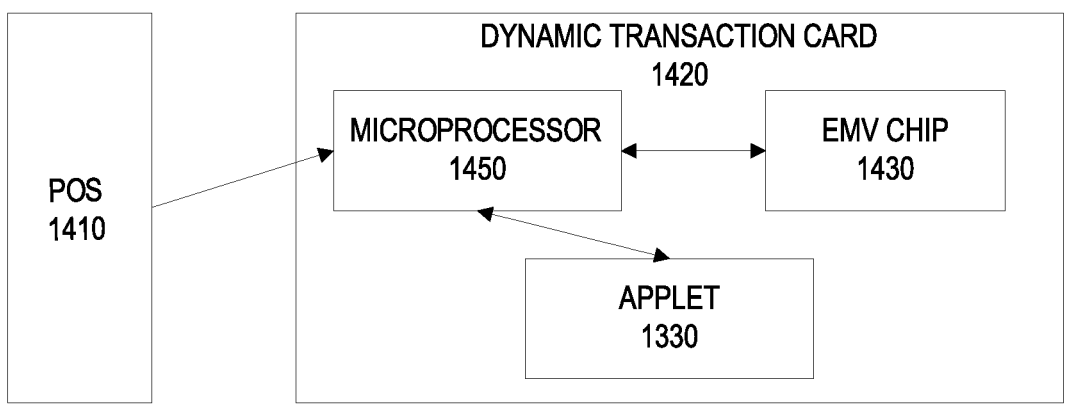
FIG. 14 depicts an example embodiment of a system including a dynamic transaction card according to embodiments of the disclosure.

FIGS. 12, 13, and 14 illustrate example configurations and methods of communication and/or connection between a terminal, such as a PoS terminal. and components of a dynamic transaction card, such as an EMV processor via EMV contacts, microprocessor, and/or applet. Using these example configurations, data may be transmitted between a terminal, EMV contacts, EMV processor, applet, and/or microprocessor in a secure manner in order to perform the methods described herein. For example, by using the depicted connections, data may be stored and/or updated in a dynamic transaction card. Using the depicted connections, the data stored and/or updated in a dynamic transaction card may be used to generate a display component on a dynamic transaction card, such as a dot matrix display, an LED or OLED display, and/or the like.

For example, as depicted in FIG. 12, the system 1200 may include a PoS terminal 1210 and a dynamic transaction card 1220. Upon connection between a PoS terminal 1210 and a dynamic transaction card 1220, using for example EMV processor 1230, data may be read and encrypted using a private key stored within EMV processor 1230. The encrypted data may be transmitted along with plaintext data from a PoS terminal 1210 to an acquirer, a payment network, and/or an issuer where the encrypted data may be decrypted. The decrypted data may be compared with the plaintext data at the issuer. The issuer may use the decrypted data to process a transaction being conducted at a PoS terminal 1210. Once a transaction has been processed at an issuer, a response (e.g., a plaintext response) may be sent from the issuer to a dynamic transaction card via a payment network, acquirer, and/or PoS terminal 1210.

A response may then be transmitted to an EMV processor 1230 on dynamic transaction card 1220. An EMV processor 1230 may then transmit data to an applet 1240, which may then be transmitted to a microprocessor 1250. In this manner, the EMV processor 1230 may include protocols and/or interfacing hardware and/or software to communicate with applet 1240, which may then communicate with a microprocessor 1250.

FIG. 13 illustrates a terminal 1310 and dynamic transaction card 1320 included in a system 1300. In FIG. 13, an applet 1340 may be in communication with a terminal 1310, whereby the applet 1340 may act as a conduit between the EMV processor 1330 and terminal 1310. In this manner, the plaintext data responses may be read and processed using the applet 1340 and/or microprocessor 1350. For example, applet 1340 may pass any received data to microprocessor 1350 where the data may be processed according to any method described herein. Microprocessor may then transmit the processed data to the applet 1340 where the data may be used to generate and/or change a display.

FIG. 14 illustrates a terminal 1410 and dynamic transaction card 1420 included in a system 1400. In FIG. 14, a microprocessor 1450 may be in communication with a terminal 1410, whereby the microprocessor 1450 may act as a conduit between the EMV processor 1430 and terminal 1410. In this manner, the plaintext data responses may be read and processed using the microprocessor 1450. For example, microprocessor 1450 may processed the response data according to any method described herein. Microprocessor 1450 may then transmit the processed data to the applet 1440 where the data may be used to generate and/or change a display.

Figure 15:
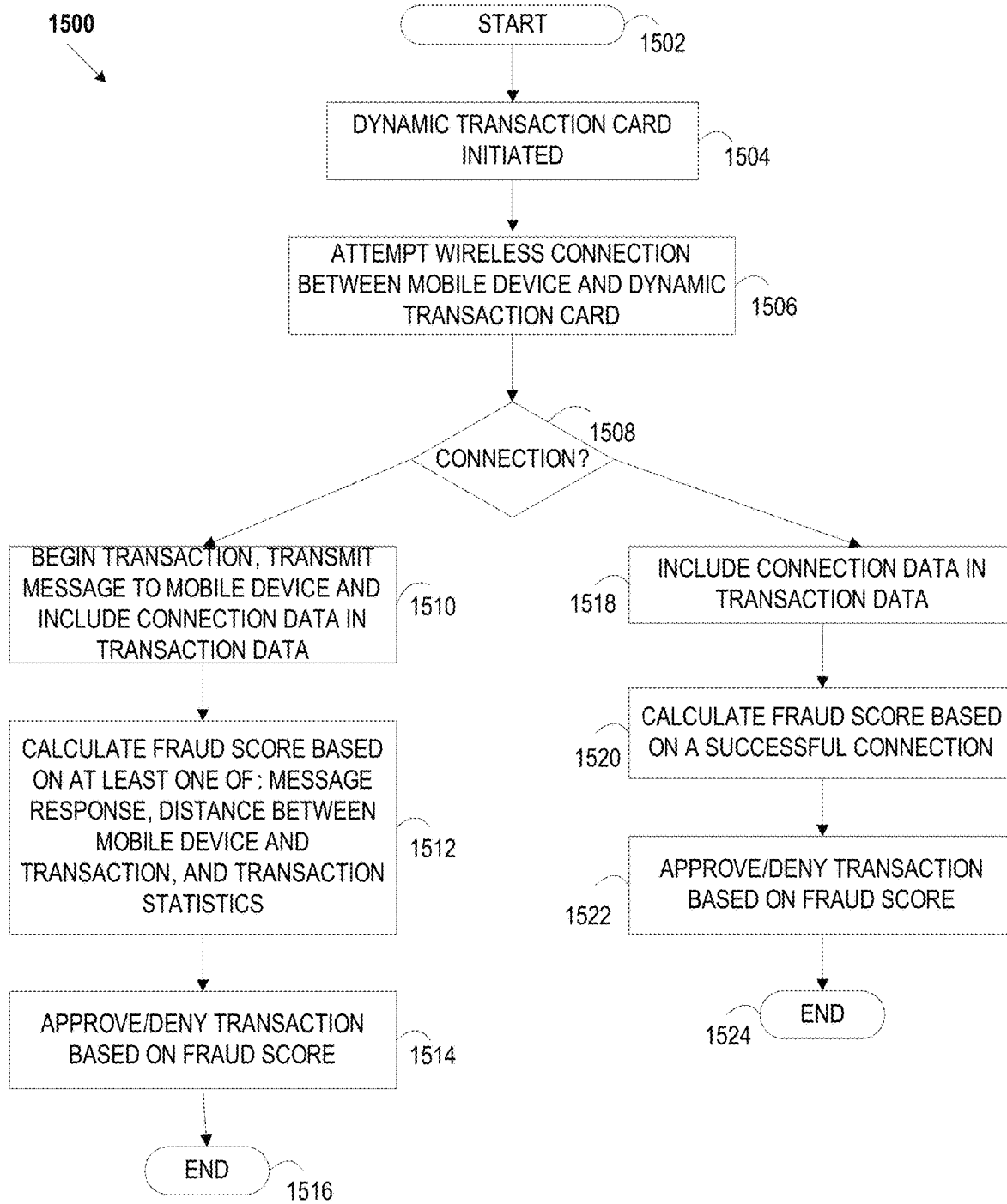
FIG. 15 depicts an example embodiment of a method for conducting a transaction associated with a dynamic transaction card according to embodiments of the disclosure.

FIG. 15 illustrates a method 1500 for detecting fraud using a dynamic transaction card 200/700 in a transaction. The techniques and technologies used to detect fraud in a transaction may be similar to those described in U.S. patent application Ser. No. 14/977,730, the entire contents of which are incorporated herein by reference. The method 1500 may be used in conjunction with existing fraud detection methods and/or technologies and/or newly developed fraud detection methods and technologies.

The method may begin at block 1502. At block 1504 a dynamic transaction card, such as card 200 or 700, may be initiated. A dynamic transaction card may be initiated upon removing a card from a wallet via light sensors, touch sensors, and/or other types of sensors described herein. Upon initiation, dynamic transaction card may attempt to pair with a known mobile device, such as an account holder's smartphone, at block 1506. At block 1508, a determination regarding a connection is stored within the dynamic transaction card.

At block 1510, where a connection is not made, a transaction may be initiated. Upon initiation of a transaction, along with the transaction data (e.g., merchant identifier, purchase price, and/or the like), data indicating that no connection was made between the dynamic transaction card and a mobile device may be included. Upon receiving this information, a backend system may transmit a message to a known mobile device associated with the dynamic transaction card. A message may include a notification of a non-pairing transaction, a request for approval of a non-pairing transaction, and/or the like. A backend system may continue to calculate a fraud score based on the non-pairing transaction alone or in conjunction with additional fraud calculations already in place or may wait for a response from the known mobile device that received the transmitted message. If the backend system waits for a response from the known mobile device, the non-pairing data as well as the response data may be included with the transaction data to calculate a fraud score for the transaction. This calculation of a fraud score may be based on any of the following data, either alone, or in conjunction with existing fraud calculations: responds data, transaction data, pairing data, and location data.

At block 1512, a fraud score may be calculated for a non-pairing transaction. A fraud score may be based on a transaction amount, a merchant identifier, as well as the response data, the non-pairing data, a distance between a known mobile device and the transaction card, and/or transaction statistics associated with the account holder of the dynamic transaction card. Transaction statistics may include, a number of transactions that occur without pairing, a percentage of transactions that occur without pairing, a number of transactions approved without pairing, a percentage of transactions approved without pairing, and/or the like.

At block 1514 a transaction may be approved or denied based on the calculated fraud score.

At block 1518, where a connection is made, a transaction may be initiated. Upon initiation of a transaction, along with the transaction data (e.g., merchant identifier, purchase price, and/or the like), data indicating that a connection was made between the dynamic transaction card and a mobile device may be included. At block 1520, a fraud score may be calculated based on a successful pairing. A fraud score may be based on a transaction amount, a merchant identifier, as well as, the response data, the non-pairing data, a distance between a known mobile device and the transaction card, and/or transaction statistics associated with the account holder of the dynamic transaction card. Transaction statistics may include, a number of transactions that occur without pairing, a percentage of transactions that occur without pairing, a number of transactions approved without pairing, a percentage of transactions approved without pairing, and/or the like.

At block 1522, a transaction may be approved or denied based on the calculated fraud score.

At blocks 1516 and/or 1524, the method 1500 may end.

Figure 16:
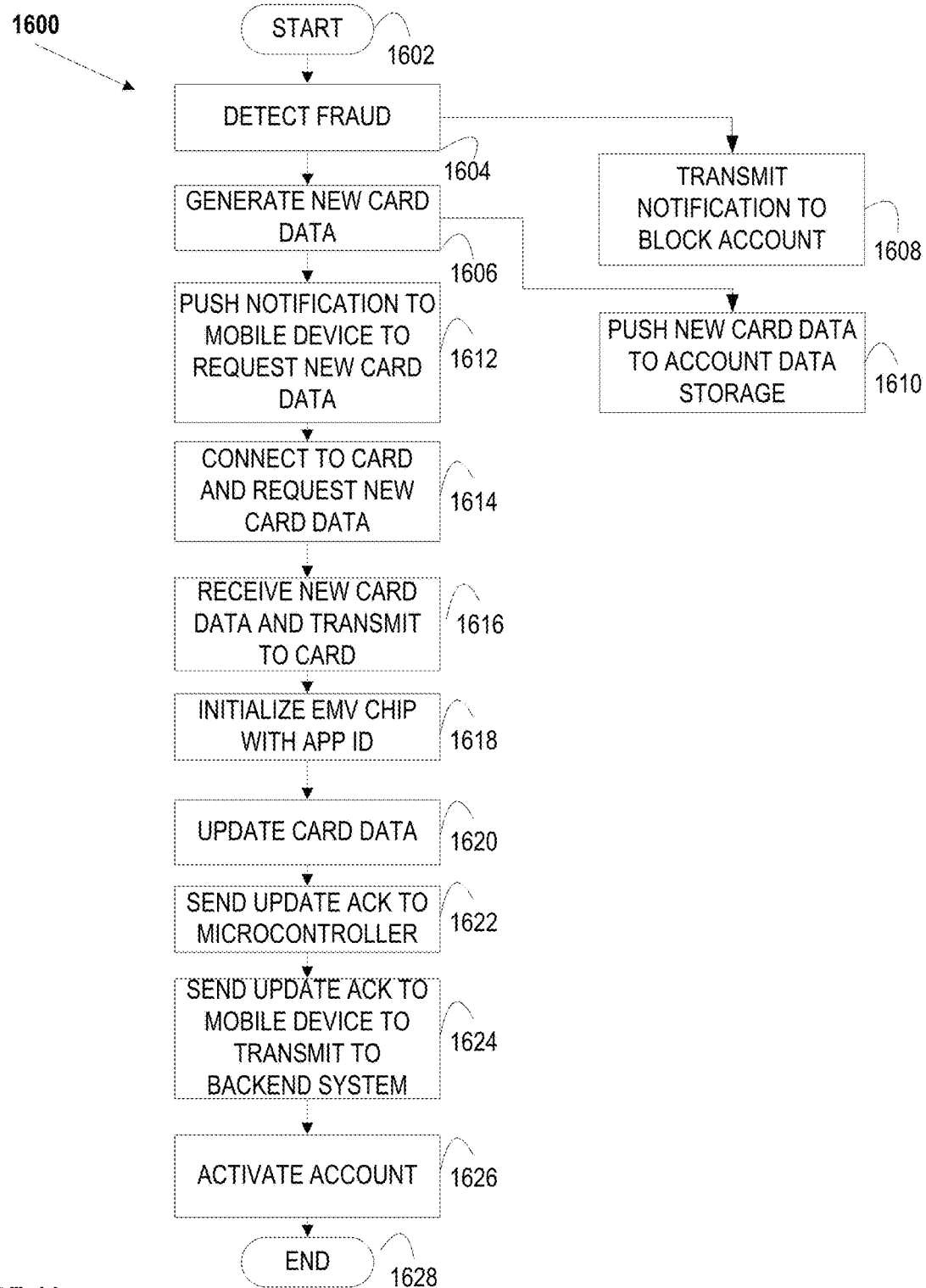
FIG. 16 depicts an example embodiment of a method for detecting fraud associated with a dynamic transaction card according to embodiments of the disclosure.

FIG. 16 illustrates a method 1600 used after a fraud detection, either using methods disclosed herein or existing fraud detection methods, to automatically activate new card data on a dynamic transaction card (e.g., dynamic transaction card 200, dynamic transaction card 700).

The method 1600 may begin at block 1602 when a backend financial institution system detects a fraudulent transaction. Once a fraudulent transaction is detected at a backend financial institution system, a notification may be transmitted to the account data storage to block the account associated with the fraudulent transaction from being used (block 1606). At block 1604, a backend financial institution system may generate new card data (e.g., a new card activation signal, a new card number, a new security code, a new expiration date, and/or the like). At block 1608, a backend financial system may push or transmit the new card data to an account data storage to associate the new card data with the account that was marked as associated with a fraudulent transaction.

At block 1610, a backend financial institution system may transmit (e.g., push) a notification to the mobile device of the account holder associated with the fraud detection and new card data. A notification may include data indicating that fraud has been detected, data indicating that the account data currently stored on a dynamic transaction card is no longer active, and/or data indicating that new card data must be requested. At block 1612, in response to receiving a notification, an account holder associated with the mobile device may request new card data (e.g., pull the data) from a backend financial institution system using, for example, a financial institution mobile application and/or a mobile optimized website. At block 1612, a user may connect to a dynamic transaction card, for example, using Bluetooth, BLE, RFID, WiFi, and/or other wireless networks by turning on pairing capabilities of the dynamic transaction card and mobile device, searching for pairing devices, and connecting the two devices.

At block 1614, in response to a request for new card data, the account holder's mobile device may receive, via a wireless network, new card data from a backend financial institution system. At block 1614, the new card data received at the mobile device may be transmitted to the currently paired dynamic transaction card, where it may be stored on a microcontroller, microprocessor, and/or EMV processor. As discussed herein, new card data and/or new account data may be fully or partially pre-loaded onto a dynamic transaction card. Accordingly, the received new card data may include only an activation signal that when received and executed on a microcontroller, microprocessor, and/or EMV processor of a dynamic transaction card, instructs the card to activate pre-stored new card data and/or pre-stored new account data.

At block 1616, a microcontroller may initialize an EMV processor with the financial institution application ID. In this manner, the EMV processor may associate a particular application ID associated with a specific account application running on the dynamic transaction card with the new account data. At block 1618, an application running on the dynamic transaction card may update the active card data stored on the dynamic transaction card with the new account data received and/or pre-stored on the dynamic transaction card. At block 1620, the application running on the dynamic transaction card may transmit a response to the microcontroller to confirm that the active card data stored on the dynamic transaction card has been successfully updated with the new card data.

At block 1622, a microcontroller on the dynamic transaction card may transmit the confirmation of a successful update to the mobile device associated with the account holder via the paired wireless connection. This confirmation may then be transmitted from the mobile device to a backend financial institution system where the account data may be updated to reflect the confirmation. Once confirmation that the account has been successfully activated on the dynamic transaction card is received at the backend financial institution system, the backend financial institution system may then change the status associated with the new card data from inactive to active.

In an example embodiment, a dynamic EMV card may be used in conjunction with settings stored on a mobile device to provide a dynamic transaction card interface that may be understood by users with visual/audio impairments. For example, a user of a mobile device may provide impairment setting to the mobile device, such as mobile device 140. These setting may indicate a particular visual impairment, such as nearsightedness, farsightedness, glaucoma, or other visual impairments, or audio impairments. The impairment setting may be stored in memory within the mobile device (e.g., nonvolatile memory). The impairment setting may be transmitted along with a data alert to the dynamic transaction card via a network, such as WiFi, RFID, or BLE. The impairment setting may include instructions that when executed on the dynamic transaction card instruct the dynamic transaction card to illustrate the alert in a manner that may be understood by a user with the indicated impairment. For example, a user with a visual impairment may require specific shapes, blinking patters, and/or colors to best indicate and alert.

Various colors, symbols, and blinking patterns may be used based on the impairment setting. In this manner, a monochromatic display may become an RGB display to assist those with visual/audio impairments. As an example, FIG. 17 illustrates a method 1700 that may be used to generate a display on a dynamic transaction card (such as card 200, 700) that may be understood by a user with an impairment. The method may begin at block 1702. At block 1704, a mobile device may receive a user setting indicating an impairment. The impairment setting may be stored in memory associated with the mobile device and/or dynamic transaction card. At block 1706, a connection may be made between the mobile device and the dynamic transaction card (e.g., WiFi, RFID, BLE, and the like). When a dynamic transaction card is used in a transaction as described herein, the mobile device associated with the dynamic transaction card may receive data from a backend system storing account information associated with the dynamic transaction card and/or from the dynamic transaction card itself (block 1.708). The data may indicate a balance, a credit limit, a budget balance, a transaction amount, and the like. At block 1710, the mobile device may generate alert data to transmit the information received from the backend server to the dynamic transaction card for display (block 1712). The alert data that is generated may include data that can instruct the dynamic transaction card to generate a visual display indicating the particular alert. The alert data also may include data that can instruct the dynamic transaction card to generate a visual display specific to the impairment data.

For example, the data that is transmitted to the dynamic transaction card may instruct the dynamic transaction card to, instead of displaying an alphanumeric value, display a specific symbol (e.g., circle, square, triangle, octagon, and the like), a specific color (e.g., red, yellow, green, blue, and the like), or a combination of symbols and colors (e.g., red octagon, green circle, and the like). The data that is transmitted to the dynamic transaction card may instruct the dynamic transaction card to display a pattern of blinking lights (e.g., fast blinking, slow blinking, blinking in a specific order, and the like) to indicate a balance, a credit limit, a budget balance, a transaction amount, and the like.

FIG. 18 illustrates a method 1800 that may be used to generate a display on a dynamic transaction card (such as card 200, 700) that may be understood by a user with an impairment. The method 1800 may begin at block 1802. At block 1804, a mobile device may receive a user setting indicating an impairment. At block 1806, a connection may be made between the mobile device and the dynamic transaction card (e.g., WiFi, RHO, BLE, and the like). At block 1808, the mobile device may transmit the impairment setting to the dynamic transaction card, where it may be stored, for example, in nonvolatile memory. Storing the impairment settings in nonvolatile memory within the dynamic transaction card may allow the dynamic transaction card to convert any alert or request for data to be displayed on the dynamic transaction card to be converted on the dynamic transaction card into a display of data that may be readily understood by users with the impairment. For example, when a dynamic transaction card is used in a transaction as described herein, the mobile device associated with the dynamic transaction card may receive data from a backend system storing account information associated with the dynamic transaction card and/or from the dynamic transaction card itself (block 1810). The data may indicate a balance, a credit limit, a budget balance, a transaction amount, and the like. At block 1812, the mobile device may generate alert data to transmit the information received from the backend server to the dynamic transaction card for display. The alert data that is generated may include data that can instruct the dynamic transaction card to generate a visual display indicating the particular alert. Once received at the dynamic transaction card, the dynamic transaction card may convert the alert into a display that may be readily understood by the user with the impairment. For example, a display indicating a particular balance may be altered from an alphanumeric display to a color/shape display that may indicate the particular balance. In this example, a balance that is at 75% of the limit may be indicated using a red octagon, whereas a balance that is 25% of the account limit may be indicated using a green circle.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A., B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A method for receiving updated account information for a transaction card, the method comprising:
    storing, in memory of the transaction card, inactive account data and an encryption key;
    connecting, with a transceiver of the transaction card, to a user device;
    receiving, at the transceiver, an activation signal from the user device;
    activating, with a microprocessor of the transaction card, the inactive account data to create active account data;
    transmitting, with a microchip, a request for the updated account information for the active account data to a point-of-sale (POS) terminal;
    receiving, at the microchip, the updated account information in an encrypted format from the POS terminal; and
    decrypting, with the microprocessor, the updated account information using the encryption key.

2. The method of claim 1, wherein:
    the microchip is in electrical communication with a EuroPay-MasterCard-Visa (EMV) contact pattern; and
    the method further comprises connecting to the POS terminal via the EMV contact pattern.

3. The method of claim 1, wherein:
    the microchip is in electrical communication with the transceiver; and
    the method further comprises wirelessly connecting to the POS terminal via the transceiver.

4. The method of claim 1 further comprising further comprising populating a display of the transaction card with the active account data.

5. The method of claim 4, wherein the display provides a transaction amount, an updated account balance, an updated budget balance, an account limit, and/or a transaction history with the updated account information.

6. The method of claim 1 further comprising:
    deactivating, via the microprocessor, the transaction card in response to at least one of:
        detecting an input at a sensor of the transaction card;
        an expiration of a predetermined time after detecting the input at the sensor; or
        losing a connection between the transaction card and the user device.

7. The method of claim 1, wherein:
    the inactive account data comprises a plurality of financial accounts associated with the transaction card;
    the updated account information is associated with a first financial account of the plurality of financial accounts; and
    the method further comprises:
        receiving, at an input/output device of the transaction card, an input selecting the first financial account.

8. The method of claim 1 further comprising displaying, via a display, a transaction amount, an updated account balance, an updated budget balance, an account limit, and/or a transaction history with the updated account information.

9. The method of claim 1, wherein the activation signal is received in response to fraud detection associated with a transaction.

10. The method of claim 9, wherein the fraud detection is calculated based on a fraud score that is based at least in part on a connection between the user device and the transaction card.

11. The method of claim 10, wherein the fraud score is further calculated based on at least one of a transaction amount, a merchant identifier, or transaction statistics associated with the transaction.

* * * * *